United States Patent
Iwamoto et al.

(10) Patent No.: US 9,238,354 B2
(45) Date of Patent: Jan. 19, 2016

(54) INTERMEDIATE FILM FOR LAMINATED GLASS, MULTILAYER INTERMEDIATE FILM FOR LAMINATED GLASS, AND LAMINATED GLASS

(75) Inventors: Tatsuya Iwamoto, Kouka (JP); Kohei Kani, Kouka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 13/517,234

(22) PCT Filed: Dec. 24, 2010

(86) PCT No.: PCT/JP2010/073301
§ 371 (c)(1),
(2), (4) Date: Jun. 19, 2012

(87) PCT Pub. No.: WO2011/078313
PCT Pub. Date: Jun. 30, 2011

(65) Prior Publication Data
US 2012/0263958 A1 Oct. 18, 2012

(30) Foreign Application Priority Data
Dec. 25, 2009 (JP) ................................. 2009-294969

(51) Int. Cl.
*B32B 17/10* (2006.01)
*C08K 5/103* (2006.01)

(52) U.S. Cl.
CPC ........... *B32B 17/10761* (2013.01); *C08K 5/103* (2013.01); *Y10T 428/31645* (2015.04); *Y10T 428/31859* (2015.04); *Y10T 428/31924* (2015.04)

(58) Field of Classification Search
USPC .................................. 428/436, 437, 524, 525
See application file for complete search history.

(56) References Cited

U.S. PATENT DOCUMENTS 4,654,179 A * 3/1987 Cartier et al. ............... 264/176.1
5,340,654 A * 8/1994 Ueda et al. ..................... 427/437
(Continued)

FOREIGN PATENT DOCUMENTS

CN 101426746 A 5/2009
EP 1527107 B1 * 6/2007
(Continued)

OTHER PUBLICATIONS

International Preliminary Report on Patentability for Application No. PCT/JP2010/073301 mailed Aug. 23, 2012.
(Continued)

*Primary Examiner* — Elizabeth A Robinson
*Assistant Examiner* — Daniel D Lowrey
(74) *Attorney, Agent, or Firm* — Cheng Law Group, PLLC

(57) ABSTRACT

An interlayer film for a laminated glass includes a thermoplastic resin and a plasticizer. The ratio of a high molecular weight component with an absolute molecular weight of 1000000 or more in the thermoplastic resin is 7.4% or higher, or the ratio of a high molecular weight component with a polystyrene-equivalent molecular weight of 1000000 or more in the thermoplastic resin is 9% or higher. A first multilayer interlayer for a laminated glass includes an interlayer film for a laminated glass and an interlayer film for a laminated glass that contains it thermoplastic resin and a plasticizer, and is laminated on one face of the interlayer film for a laminated glass.

10 Claims, 1 Drawing Sheet

(56) References Cited

U.S. PATENT DOCUMENTS

| | | | |
|---|---|---|---|
| 6,696,390 B1* | 2/2004 | Hatada et al. | 503/227 |
| 7,468,209 B2* | 12/2008 | Toyama et al. | 428/437 |
| 8,715,815 B2* | 5/2014 | Shimamoto et al. | 428/213 |
| 8,741,439 B2* | 6/2014 | Shimamoto et al. | 428/436 |
| 2003/0139520 A1 | 7/2003 | Toyama et al. | |
| 2005/0239960 A1* | 10/2005 | Papenfuhs et al. | 525/61 |
| 2009/0258224 A1* | 10/2009 | Kawabe et al. | 428/339 |
| 2009/0305058 A1 | 12/2009 | Marumoto | |
| 2010/0028642 A1* | 2/2010 | Steuer et al. | 428/220 |
| 2010/0279150 A1 | 11/2010 | Hatta et al. | |
| 2011/0059320 A1 | 3/2011 | Ii et al. | |

FOREIGN PATENT DOCUMENTS

| | | |
|---|---|---|
| JP | 6-926 A | 1/1994 |
| JP | 11-255827 A | 9/1999 |
| JP | 2001-97745 A | 4/2001 |
| JP | 2001-316140 A | 11/2001 |
| JP | 2003-252655 A | 9/2003 |
| JP | 2003-252657 A | 9/2003 |
| JP | 2004-107143 A | 4/2004 |
| JP | 2004-143008 A | 5/2004 |
| JP | 2007-70200 A | 3/2007 |
| WO | WO-2009/093655 A1 | 7/2009 |
| WO | WO-2009/123186 A1 | 10/2009 |

OTHER PUBLICATIONS

International Search Report for the Application No. PCT/JP2010/073301 mailed Mar. 15, 2011.
Third Party Submission of Patents or Publications for the Application No. 2011-147482 from Japan Patent Office dated Oct. 7, 2014.
The First Office Action for the Application No. 201080058954.8 from the State Intellectual Property Office of the People's Republic of China dated Mar. 18, 2014.
Notification of Reasons for Refusal for the Application No. 2011-147482 from Japan Patent Office mailed Jun. 3, 2014.
Notification of Reasons for Refusal for the Application No. 2011-147482 from Japan Patent Office mailed Feb. 3, 2015.

* cited by examiner

US 9,238,354 B2

INTERMEDIATE FILM FOR LAMINATED GLASS, MULTILAYER INTERMEDIATE FILM FOR LAMINATED GLASS, AND LAMINATED GLASS

TECHNICAL FIELD

The present invention relates to an interlayer film for a laminated glass that contains a thermoplastic resin and a plasticizer. More specifically, the present invention relates to an interlayer film for a laminated glass which has excellent sound insulation and hardly causes bubble formation therein; and a multilayer interlayer film for a laminated glass and a laminated glass each including the interlayer film for a laminated glass.

BACKGROUND ART

A laminated glass is a safety glass which, even when broken by impact from the outside, shatters into few flying glass fragments. For this reason, a laminated glass is widely used for cars, rail cars, aircrafts, boats and ships, buildings, and the like. The laminated glass is produced by sandwiching an interlayer film for a laminated glass between a pair of glass plates.

Patent Document 1 provides one example of the interlayer film for a laminated glass; that is, Patent Document 1 teaches an interlayer film containing 100 parts by weight of a polyvinyl acetal resin and 20 to 60 parts by weight of a mixture of triethylene glycol mono-2-ethylhexanoate and triethylene glycol di-2-ethylhexanoate.

Patent Document 2 teaches a sound insulation layer that contains 100 parts by weight of a polyvinyl acetal resin having a degree of acetalization of 60 to 85 mol %, 0.001 to 1.0 part by weight of at least one metal salt of alkali metal salts and alkaline earth metal salts, and at least 30 parts by weight of a plasticizer. This sound insulation layer alone can be used as an interlayer film.

Patent Document 2 also teaches a multilayer interlayer film in which the sound insulation layer and another layer are laminated. The another layer laminated on the sound insulation layer contains 100 parts by weight of a polyvinyl acetal resin having a degree of acetalization of 60 to 85 mol %, 0.001 to 1.0 part by weight of at least one metal salt among alkali metal salts and alkaline earth metal salts, and 30 parts by weight or less of a plasticizer.

Patent Document 1: JP 2001-097745 A
Patent Document 2: JP 2007-070200 A

SUMMARY OF THE INVENTION

Problems to be Solved by the Invention

A laminated glass formed with use of the interlayer film of Patent Document 1 has insufficient sound insulation for sound with a frequency of about 2000 Hz, and therefore may not prevent decrease in sound insulation when the coincidence effect occurs. Also, the sound insulation of the laminated glass is sometimes insufficient at around 20° C.

Here, the coincidence effect refers to a phenomenon in which, upon incidence of sound waves on a glass plate, transverse waves due to rigidity and inertia of the glass plate spread on the glass surface to resonate with the incidence sound, whereby the sound is transmitted.

A laminated glass formed with use of a single layer of the sound insulation layer as an interlayer film disclosed in Patent Document 2 may provide insufficient sound insulation at around 20° C.

Moreover, in the case of forming a laminated glass using the multilayer interlayer film of Patent Document 2 in which a sound insulation layer and another layer are laminated, the sound insulation of the laminated glass at around 20° C. can be increased to some extent. However, since the multilayer interlayer film includes the sound insulation layer, bubble formation may occur in the laminated glass formed with use of the multilayer interlayer film.

Meanwhile, considerations have been made in recent years to increase the amount of the plasticizer in an interlayer film for increasing the sound insulation of a laminated glass. Increasing the amount of the plasticizer can improve the sound insulation of the laminated glass. However, the increase in the amount of the plasticizer sometimes causes bubble formation in the laminated glass.

The present invention aims to provide an interlayer film for a laminated glass which can give a laminated glass capable of suppressing bubble formation and bubble growth; and a multilayer interlayer film for a laminated glass and a laminated glass each including the interlayer film for a laminated glass.

The present invention specifically aims to provide an interlayer film for a laminated glass which can give a laminated glass having excellent sound insulation and capable of suppressing bubble formation and bubble growth; and a multilayer interlayer film for a laminated glass and a laminated glass each including the interlayer film for a laminated glass.

Means for Solving the Problems

A broad aspect of the present invention is an interlayer film for a laminated glass, including a thermoplastic resin and a plasticizer, wherein the thermoplastic resin contains a high molecular weight component with an absolute molecular weight of 1000000 or more, and the ratio of the high molecular weight component in the thermoplastic resin is 7.4% or higher, or the thermoplastic resin contains a high molecular weight component with a polystyrene-equivalent molecular weight of 1000000 or more, and the ratio of the high molecular weight component in the thermoplastic resin is 9% or higher.

In a specific aspect of the interlayer film for a laminated glass according to the present invention, the interlayer film for a laminated glass includes a thermoplastic resin and a plasticizer, wherein the thermoplastic resin contains a high molecular weight component with an absolute molecular weight of 1000000 or more, and the ratio of the high molecular weight component in the thermoplastic resin is 7.4% or higher.

In another specific aspect of the interlayer film for a laminated glass according to the present invention, the thermoplastic resin is a polyvinyl acetal resin.

In another specific aspect of the interlayer film for a laminated glass according to the present invention, the polyvinyl acetal resin has a hydroxyl content of at most 31 mol %.

In a yet another specific aspect of the interlayer film for a laminated glass according to the present invention, an amount of the plasticizer for each 100 parts by weight of the thermoplastic resin is within a range of 40 to 80 parts by weight.

In a specific aspect of the interlayer film for a laminated glass according to the present invention, the interlayer film for a laminated glass includes a thermoplastic resin and a plasticizer, wherein the thermoplastic resin contains a high molecular weight component with a polystyrene-equivalent molecular weight of 1000000 or more, and the ratio of the high molecular weight component in the thermoplastic resin is 9% or higher.

A multilayer interlayer film for a laminated glass according to the present invention includes the interlayer film for a laminated glass structured according to the present invention as a first interlayer film for a laminated glass, and a second interlayer film for a laminated glass that contains a thermoplastic resin and a plasticizer and is laminated on one face of the first interlayer film for a laminated glass.

In a specific aspect of the multilayer interlayer film for a laminated glass according to the present invention, an amount of the plasticizer for each 100 parts by weight of the thermoplastic resin in the first interlayer film for a laminated glass is larger than an amount of the plasticizer for each 100 parts by weight of the thermoplastic resin in the second interlayer film for a laminated glass.

In another specific aspect of the multilayer interlayer film for a laminated glass according to the present invention, the multilayer interlayer film for a laminated glass further includes a third interlayer film for a laminated glass that contains a thermoplastic resin and a plasticizer and is laminated on the other face of the first interlayer film for a laminated glass.

In a yet another specific aspect of the multilayer interlayer film for a laminated glass according to the present invention, an amount of the plasticizer for each 100 parts by weight of the thermoplastic resin in the first interlayer film for a laminated glass is larger than an amount of the plasticizer for each 100 parts by weight of the thermoplastic resin in the third interlayer film for a laminated glass.

Meanwhile, for example, the plasticizer may migrate between the first interlayer film for a laminated glass and the second interlayer film for a laminated glass.

In another specific aspect of the multilayer interlayer film for a laminated glass according to the present invention, the thermoplastic resin in the first interlayer film for a laminated glass is a polyvinyl acetal resin, and the polyvinyl acetal resin has a degree of acetylation of at most 8 mol % and a degree of acetalization of 70 mol % or higher.

In a yet another specific aspect of the multilayer interlayer film for a laminated glass according to the present invention, the thermoplastic resin in the first interlayer film for a laminated glass is a polyvinyl acetal resin, and the polyvinyl acetal resin has a degree of acetylation of higher than 8 mol %.

The laminated glass according to the present invention includes first laminated glass component, second laminated glass component, and an interlayer film or a multilayer interlayer film sandwiched between the first laminated glass component and the second laminated glass component, wherein the interlayer film or the multilayer interlayer film is the interlayer film for a laminated glass or the multilayer interlayer film for a laminated glass structured according to the present invention.

Effect of the Invention

The interlayer film for a laminated glass according to the present invention includes a thermoplastic resin and a plasticizer, wherein the thermoplastic resin contains a high molecular weight component with an absolute molecular weight of 1000000 or more, and the ratio of the high molecular weight component in the thermoplastic resin is 7.4% or higher, or the thermoplastic resin contains a high molecular weight component with a polystyrene-equivalent molecular weight of 1000000 or more, and the ratio of the high molecular weight component in the thermoplastic resin is 9% or higher. Therefore, if the interlayer film for a laminated glass is used for forming a laminated glass, bubble formation and bubble growth in the laminated glass can be suppressed. Moreover, the laminated glass can have an enhanced sound insulation.

MODE(S) FOR CARRYING OUT THE INVENTION

Hereinafter, the present invention will be described in detail.

The interlayer film for a laminated glass of the present invention contains a thermoplastic resin and a plasticizer. The thermoplastic resin contains either a high molecular weight component with an absolute molecular weight of 1000000 or more (hereinafter also referred to as high molecular weight component X) or a high molecular weight component (hereinafter also referred to as high molecular weight component Y) with a polystyrene-equivalent molecular weight (hereinafter also referred to as molecular weight y) of 1000000 or more. The high molecular components X and Y each are a thermoplastic resin. In the interlayer film for a laminated glass according to the present invention, the ratio of the high molecular weight component X in the thermoplastic resin is 7.4% or higher, or the ratio of the high molecular weight component Y in the thermoplastic resin is 9% or higher.

Figure 1:
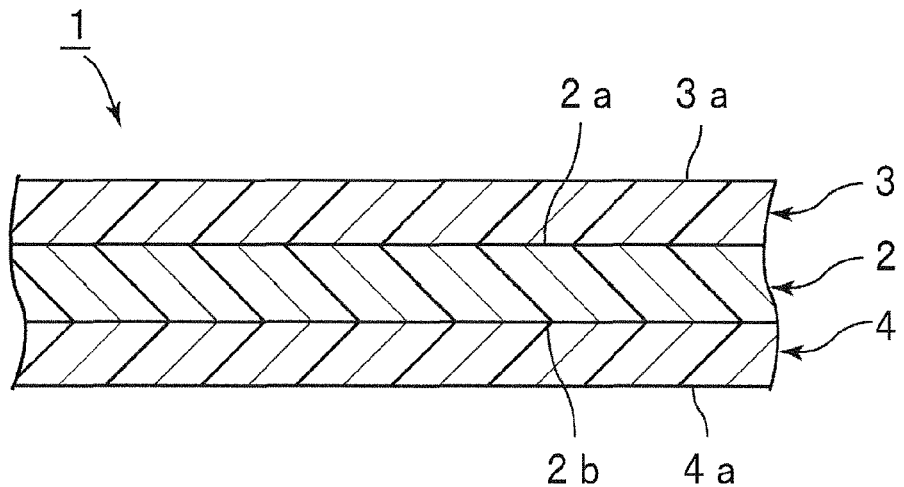
FIG. 1 is a cross-sectional view schematically illustrating a multilayer interlayer film for a laminated glass according to one embodiment of the present invention.

FIG. 1 is a cross-sectional view schematically illustrating a multilayer interlayer film for a laminated glass according to one embodiment of the present invention.

A multilayer interlayer film 1 illustrated in FIG. 1 includes a first interlayer film 2, a second interlayer film 3 laminated on one face 2a (first face) of the first interlayer film 2, and a third interlayer film 4 laminated on the other face 2b (second face) of the first interlayer film 2. The multilayer film 1 is used to prepare a laminated glass. The multilayer interlayer film 1 is a multilayer interlayer film for a laminated glass. The first interlayer film 2, the second interlayer film 3 and the third interlayer film 4 are interlayer films for a laminated glass.

In the present embodiment, the first interlayer film 2 is an intermediate layer, and the second interlayer film 3 and the third interlayer film 4 are surface layers. Preferably, both the second interlayer film 3 and the third interlayer film 4 are used like this example. Only the second interlayer film 3 may be used without using the third interlayer film 4. Other interlayer films for a laminated glass may be further laminated on the outer surface 3a of the second interlayer film 3 and the outer surface 4a of the third interlayer film 4, respectively.

The first interlayer film 2, the second interlayer film 3 and the third interlayer film 4 each contain a thermoplastic resin and a plasticizer. The thermoplastic resin contained in the first interlayer film 2 contains the high molecular weight component X with an absolute molecular weight of 1000000 or more, and the ratio of the high molecular component X in the thermoplastic resin is 7.4% or higher. Alternatively, the thermoplastic resin contained in the first interlayer film 2 may contain the high molecular weight component Y with the molecular weight y of 1000000 or more, and the ratio of the high molecular weight component Y in the thermoplastic resin may be 9% or higher.

The ratio of the high molecular weight component X in the thermoplastic resin is defined by the ratio expressed in percentage (%) of an area of the region corresponding to the high molecular weight component X in the peak area of the thermoplastic resin that is obtained upon measurement of the absolute molecular weight. The ratio of the high molecular weight component Y in the thermoplastic resin is defined by the ratio expressed in percentage (%) of an area of the region corresponding to the high molecular weight component Y in the peak area of the thermoplastic resin that is obtained upon measurement of the polystyrene-equivalent molecular weight.

The compositions of the second interlayer film 3 and the third interlayer film 4 are preferably different from the composition of the first interlayer film 2. The thermoplastic resin contained in the second interlayer film 3 and the third interlayer film 4 each may contain the high molecular weight component X with an absolute molecular weight of 1000000 or more, and the ratio of the high molecular weight component X in the thermoplastic resin may be 7.4% or higher, or may contain the high molecular weight component Y with the molecular weight y of 1000000 or more, and the ratio of the high molecular weight component Y in the thermoplastic resin may be 9% or higher.

Figure 2:
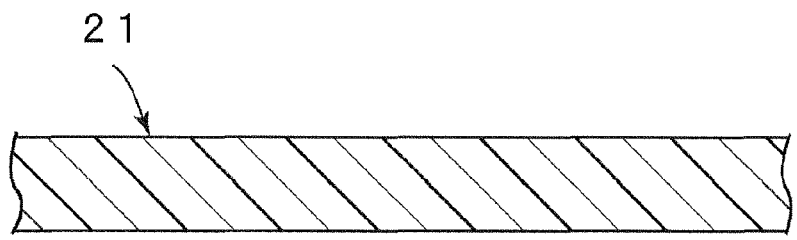
FIG. 2 is a cross-sectional view schematically illustrating an interlayer film for a laminated glass according to one embodiment of the present invention.

FIG. 2 is a cross-sectional view schematically illustrating an interlayer film for a laminated glass according to one embodiment of the present invention.

An interlayer film 21 for a laminated glass illustrated in FIG. 2 is a single-layer interlayer film. The interlayer film 21 is used for preparing a laminated glass. The interlayer film 21 is an interlayer film for a laminated glass.

The interlayer film 21 contains a thermoplastic resin and a plasticizer. The thermoplastic resin contained in the interlayer film 21 contains the high molecular weight component X with an absolute molecular weight of 1000000 or more, and the ratio of the high molecular component X in the thermoplastic resin is 7.4% or higher. Alternatively, the thermoplastic resin contained in the interlayer film 21 may contain the high molecular weight component Y with the molecular weight y of 1000000 or more, and the ratio of the high molecular weight component Y in the thermoplastic resin may be 9% or higher.

The multilayer interlayer film 1 is preferred to the single-layer interlayer film 21. In the case that the second interlayer film 3 and the third interlayer film 4 are laminated on both sides of the first interlayer film 2, even if the adhesion force of the first interlayer film 2 is low, bonding strength between the multilayer interlayer film 1 and the laminated glass components can be enhanced by increasing the adhesion force of the second interlayer film 3 and the third interlayer film 4. As a result, the penetration resistance of the laminated glass can be further increased.

In the case of the multilayer interlayer film 1, bubble formation more easily occurs in the laminated glass as compared with the single-layer interlayer film 21. In especially the case where the amount of the plasticizer for each 100 parts by weight of the thermal plastic resin in the first interlayer film 2 is larger than the amount of the plasticizer for each 100 parts by weight of thermoplastic resin in the second interlayer film 3 and the third interlayer film 4, bubble formation is more likely to occur. Further, once bubbles are generated, the bubbles tend to grow with the generated bubbles as the core. However, since the thermoplastic resin contained in the first interlayer film 2 contains a specific rate of the high molecular weight component with an absolute molecular weight of 1000000 or more in the present embodiment, bubble formation can be prevented from occurring in the laminated glass. Also, if the thermoplastic resin contained in the first interlayer 2 contains the specific ratio of the high molecular weight component Y with the molecular weight y of 1000000 or more, bubble formation can be prevented from occurring in the laminated glass.

In terms of further increasing the sound insulation of the laminated glass and further suppressing bubble formation and bubble growth, the lower limit of the ratio of the high molecular weight component X with an absolute molecular weight of 1000000 or more in the thermoplastic resin contained in the interlayer films 1, 2, and 21 is preferably 8%, more preferably 8.5%, still more preferably 9%, particularly preferably 9.5%, and most preferably 10%. The ratio of the high molecular weight component X that can further increase the sound insulation of the laminated glass and further suppress bubble formation and bubble growth is preferably 11% or higher, more preferably 12% or higher, further preferably 14% or higher, and particularly preferably 16% or higher. The preferable upper limit of the ratio of the high molecular weight component X is not particularly limited, and the upper limit is preferably 40%, more preferably 30%, and still more preferably 25%.

In the case that the thermoplastic resins contained in the interlayer films 1, 2, and 21 each contain the high molecular weight component Y with the molecular weight y of 1000000 or more, the lower limit of the high molecular weight component Y with the molecular weight y of 1000000 or more in the thermoplastic resins contained in the single-layer interlayer film containing the high molecular weight component Y and the interlayer film (first interlayer film for a laminated glass) containing the high molecular weight component Y among the multilayer interlayer film is preferably 10%, more preferably 11%, still more preferably 11.5%, and particularly preferably 12%. The ratio of the high molecular weight component Y that can further increase the sound insulation of the laminated glass and further suppress bubble formation and bubble growth is preferably 12.5% or higher, more preferably 13.5% or higher, still more preferably 14% or higher, particularly preferably 15% or higher, and most preferably 18% or higher. The upper limit of the ratio of the high molecular weight component Y is not particularly limited, and the upper limit is preferably 40%, more preferably 30%, and still more preferably 25%. If the ratio of the high molecular weight component Y is at least the lower limit, the sound insulation of the laminated glass can be further increased, and bubble formation and bubble growth can be further suppressed.

In terms of further increasing the penetration resistance of the laminated glass, the lower limit of the thickness of the multilayer interlayer film 1 and single-layer interlayer film 21 is preferably 0.05 mm, and more preferably 0.25 mm. The upper limit of the thickness is preferably 3 mm, and more preferably 1.5 mm. If the thickness of the multilayer interlayer film 1 and single-layer interlayer film 21 satisfy the preferable lower limit and the preferably upper limit, the penetration resistance and the transparency of the laminated glass can be further increased.

(Thermoplastic Resin)

The kinds of the thermoplastic resins contained in the interlayer films 2 to 4, and 21 are not particularly limited. Only one kind of thermoplastic resin may be used, and two or more kinds thereof may be concomitantly used.

Examples of the thermoplastic resin include polyvinyl acetal resins, ethylene-vinyl acetate copolymer resins, ethylene-acryl copolymer resins, polyurethane resins, and polyvinyl alcohol resins.

The minimum weight average molecular weight of the thermoplastic resin is preferably 100000, and more preferably 300000. The maximum weight average molecular weight is preferably 10000000, and more preferably 5000000. If the weight average molecular weight of the thermoplastic resin is lower than the minimum value, the strength of the interlayer film may decrease. If the weight average molecular weight of the thermoplastic resin is higher than the maximum value, the strength of the interlayer film to be produced may be too high. The weight average molecular weight indicates a polystyrene-equivalent weight average molecular weight measured by gel permeation chromatography (GPC).

Preferably, the thermoplastic resin is a polyvinyl acetal resin. Concomitant use of the polyvinyl acetal resin and the plasticizer can further increase the adhesive force of the interlayer film or the multilayer interlayer film to the laminated glass components. If the thermoplastic resin is a polyvinyl acetal resin, the high molecular weight components X and Y are polyvinyl acetal resins.

Moreover, if the thermoplastic resin is a polyvinyl acetal resin, bubble formation tends to occur in the laminated glass which includes the interlayer film or the multilayer interlayer film. However, as the polyvinyl acetal resin contains the high molecular weight component X with an absolute molecular weight of 1000000 or more or the high molecular weight component Y with the molecular weight y of 1000000 or more at the specific ratio, bubble formation and bubble growth can be sufficiently suppressed in the laminated glass which includes the interlayer film for a laminated glass.

In the case that the interlayer film 2, which is an intermediate layer, and the single-layer interlayer film 21 contain a polyvinyl acetal resin, the hydroxyl content (the amount of the hydroxyl group) in the polyvinyl acetal resin contained in the interlayer films 2 and 21 is preferably at most 31 mol %. In this case, the sound insulation of the laminated glass can be further increased. If the hydroxyl content of the polyvinyl acetal resin is low, the hydrophilicity of the polyvinyl acetal resin is low. Hence, the amount of the plasticizer can be increased and, as a result, the sound insulation of the laminated glass can be further increased.

The minimum hydroxyl content of the polyvinyl acetal resin in the interlayer films 2 and 21 is preferably 13 mol %, more preferably 18 mol %, still more preferably 20 mol %, and particularly preferably 21.5 mol %. The maximum hydroxyl content is preferably 30 mol %, more preferably 28 mol %, and particularly preferably 26 mol %. If the hydroxyl content satisfies the preferable minimum amount, the adhesion force of the interlayer films 2 and 21 can be further increased. If the hydroxyl content satisfies the preferable maximum amount, the sound insulation of the laminated glass can be further increased. Moreover, the multilayer interlayer film 1 and the interlayer film 21 can have higher flexibility, and thus the multilayer interlayer film 1 and the interlayer film 21 can show even higher handling properties.

In the case that the interlayer films 3 and 4 each contain a polyvinyl acetal resin, the minimum hydroxyl content of the polyvinyl acetal resin in each of the interlayer films 3 and 4 is preferably 26 mol %, more preferably 27 mol %, and still more preferably 28 mol %. The maximum hydroxyl content is preferably 35 mol %, more preferably 33 mol %, still more preferably 32 mol %, and particularly preferably 31.5 mol %. If the hydroxyl content satisfies the preferable minimum value, the adhesion force of the interlayer films 3 and 4 can be further increased. If the hydroxyl content satisfies the preferable maximum value, the multilayer interlayer film 1 can have higher flexibility, and can therefore show even higher handling properties.

In terms of further increasing the sound insulation of the laminated glass, the hydroxyl content of the polyvinyl acetal resin in the interlayer film 2 is preferably lower than the hydroxyl content of the polyvinyl acetal resin in each of the interlayer films 3 and 4. In terms of further increasing the sound insulation of the laminated glass, the hydroxyl content of the polyvinyl acetal resin in the interlayer film 2 is lower than the hydroxyl content of the polyvinyl acetal resin in each of the interlayer films 3 and 4 preferably by 1 mol % or lower, more preferably by 3 mol % or lower, and still more preferably by 5 mol % or lower, and particularly preferably 7 mol % or lower.

The hydroxyl content of the polyvinyl acetal resin is a value of the molar fraction in percentage (mol %) determined by dividing the amount of ethylene group having the hydroxyl group bonded thereto by the total amount of the ethylene group in the main chain. The amount of ethylene group having the hydroxyl group bonded thereto can be determined by, for example, determining the amount of ethylene group having the hydroxyl group bonded thereto in the polyvinyl acetal resin according to the method based on JIS K6726 "Testing Methods for Polyvinyl alcohol".

In the case that the interlayer films 2 and 21 each contain a polyvinyl acetal resin, the lowest degree of acetylation (amount of acetyl) of the polyvinyl acetal resin in each of the interlayer films 2 and 21 is preferably 0.1 mol %, more preferably 0.4 mol %, and still more preferably 0.8 mol %. The highest degree is 30 mol %, more preferably 25 mol %, still more preferably 20 mol %, and particularly preferably 15 mol %. In the case that the interlayer films 3 and 4 each contain a polyvinyl acetal resin, the lowest degree of acetylation of the polyvinyl acetal resin in each of the interlayer films 3 and 4 is preferably 0.1 mol %, and more preferably 0.4 mol %. The highest degree is preferably 20 mol %, more preferably 5 mol %, still more preferably 2 mol %, and particularly preferably 1.5 mol %. If the degree of acetylation satisfies the preferable lowest degree, the compatibility of the polyvinyl acetal resin and the plasticizer is further increased, and the glass-transition temperature of the interlayer film and the multilayer interlayer film can be sufficiently decreased. If the degree of acetylation satisfies the preferable highest degree, the humidity resistance of the interlayer film and the multilayer interlayer film can be further increased.

In terms of further increasing the sound insulation of the laminated glass, the degree of acetylation of the polyvinyl acetal resin in the interlayer film 2 is preferably larger than the degree of acetylation of the polyvinyl acetal resin in each of the interlayer films 3 and 4. In terms of even further increasing the sound insulation of the laminated glass, the degree of acetylation of the polyvinyl acetal resin in the interlayer film 2 is preferably larger than the degree of acetylation of the polyvinyl acetal resin in each of the interlayer films 3 and 4 preferably by 0.1 mol % or higher, more preferably by 1 mol % or higher, still more preferably by 5 mol % or higher, and particularly preferably by 10 mol % or higher.

In terms of even further increasing the sound insulation of the laminated glass, the degree of acetylation of the polyvinyl acetal resin in the interlayer film 2 is preferably larger than the degree of acetylation of the polyvinyl acetal resin in the interlayer films 3 and 4.

The degree of acetylation is a value of the molar fraction in percentage (mol %) determined by dividing, by the total amount of ethylene group in the main chain, a value resulting from subtracting the amount of ethylene group having the acetal group bonded thereto and the amount of ethylene group having the hydroxyl group bonded thereto from the total amount of ethylene group in the main chain. The amount of ethylene group having the acetal group bonded thereto can be determined based on JIS K6728 "Testing Methods for Polyvinyl butyral", for example.

In the case that the interlayer films 2 and 21 each containing the high molecular weight component with an absolute molecular weight of 1000000 or more at the specific ratio each contain a polyvinyl acetal resin, the lowest degree of acetalization of the polyvinyl acetal resin in each of the interlayer films 2 and 21 is preferably 50 mol %, more preferably 53 mol %, still more preferably 60 mol %, and particularly preferably 63 mol %. The highest degree is preferably 85 mol %, more preferably 80 mol %, and still more preferably 78 mol %. In the case that the interlayer films 3 and 4 each contain a polyvinyl acetal resin, the lowest degree of acetalization of the polyvinyl acetal resin in each of the interlayer films 3 and 4 is preferably 55 mol %, more preferably 60 mol %, still more preferably 65 mol %, and particularly preferably 67 mol %. The highest degree is preferably 75 mol %, more preferably 72 mol %, and still more preferably 71 mol %. If the degree of acetalization satisfies the preferable lowest degree, the compatibility of the polyvinyl acetal resin and the plasticizer is further increased, and the glass-transition temperature of the interlayer film and the multilayer interlayer film can be sufficiently decreased. If the degree of acetalization satisfies the preferable highest degree, the reaction time required to produce a polyvinyl acetal resin can be shortened.

The degree of acetalization is a value of the molar fraction in percentage (mol %) determined by dividing the amount of ethylene group having the acetal group bonded thereto by the total amount of ethylene group in the main chain.

The degree of acetalization is calculated by first measuring the amounts of the acetyl and the vinyl alcohol (hydroxyl content) by the method according to JIS K6728 "Testing Methods for Polyvinyl butyral", calculating the molar fraction from the measured amounts, and subtracting the amounts of acetyl and vinyl alcohol from 100 mol %.

Meanwhile, in the case that the polyvinyl acetal resin is a polyvinyl butyral resin, the degree of acetalization (degree of butyralization) and the amount of the acetyl are calculated based on the results measured by the method according to JIS K6728 "Testing Methods for Polyvinyl butyral".

In the case that the interlayer films 2 and 21 each contain a polyvinyl acetal resin, for further increasing the sound insulation of the interlayer films 2 and 21, the polyvinyl acetal resin is preferably a polyvinyl acetal resin A having the degree a of acetylation of at most 8 mol % and the degree a of acetalization of 70 mol % or higher, or preferably a polyvinyl acetal resin B having the degree b of acetylation of higher than 8 mol %. The polyvinyl acetal resin may be the polyvinyl acetal resin A having the degree a of acetylation of at most 8 mol % and the degree a of acetalization of 70 mol % or higher, or may be the polyvinyl acetal resin B having the degree b of acetylation of higher than 8 mol %.

The highest degree a of acetylation of the polyvinyl acetal resin A is 8 mol %, preferably 7.5 mol %, more preferably 7 mol %, still more preferably 6.5 mol %, and particularly preferably 5 mol %. The lowest degree is preferably 0.1 mol %, more preferably 0.5 mol %, still more preferably 0.8 mol %, and particularly preferably 1 mol %. If the degree a of acetylation is at most the highest degree and at least the lowest degree, migration of the plasticizer can be easily controlled, and the sound insulation of the laminated glass can be further increased.

The lowest degree a of acetalization of the polyvinyl acetal resin A is 70 mol %, preferably 70.5 mol %, more preferably 71 mol %, still more preferably 71.5 mol %, and particularly preferably 72 mol %. The highest degree is preferably 85 mol %, more preferably 83 mol %, further preferably 81 mol %, and particularly preferably 79 mol %. If the degree a of acetalization is the lowest degree or higher, the sound insulation of the laminated glass can be further increased. If the degree a of acetalization is at most the highest degree, the reaction time required to produce a polyvinyl acetal resin A can be shortened.

The minimum value of the hydroxyl content a of the polyvinyl acetal resin A is preferably 18 mol %, more preferably 19 mol %, still more preferably 20 mol %, and particularly preferably 21 mol %. The maximum value is preferably 31 mol %, more preferably 30 mol %, still more preferably 29 mol %, and particularly preferably 28 mol %. If the hydroxyl content a satisfies the preferable minimum value, the interlayer film can provide even higher adhesion. Further, if the hydroxyl content a satisfies the preferable maximum value, the sound insulation of the laminated glass can be further increased.

The polyvinyl acetal resin A is preferably a polyvinyl butyral resin.

The degree b of acetylation of the polyvinyl acetal resin B is higher than 8 mol %. The lowest degree b is preferably 9 mol %, more preferably 9.5 mol %, still more preferably 10 mol %, and particularly preferably 10.5 mol %. The highest degree of the degree is preferably 30 mol %, more preferably 28 mol %, still more preferably 26 mol %, and particularly preferably 24 mol %. If the degree b of acetylation is at least at the lowest degree, the sound insulation of the laminated glass can be further increased. If the degree b of acetylation is at most the highest degree, the reaction time required to produce the polyvinyl acetal resin B can be shortened.

The lowest degree b of acetalization of the polyvinyl acetal resin B is preferably 50 mol %, more preferably 53 mol %, still more preferably 55 mol %, and particularly preferably 60 mol %. The highest degree is preferably 80 mol %, more preferably 78 mol %, still more preferably 76 mol %, and particularly preferably 74 mol %. If the degree b of acetalization is at least the lowest degree, the sound insulation of the laminated glass can be further increased. If the degree b of acetalization is at most the highest degree, the reaction time required to produce the polyvinyl acetal resin B can be shortened.

The minimum value of the hydroxyl content b of the polyvinyl acetal resin B is preferably 18 mol %, more preferably 19 mol %, still more preferably 20 mol %, and particularly preferably 21 mol %. The maximum value is preferably 31 mol %, more preferably 30 mol %, still more preferably 29 mol %, and particularly preferably 28 mol %. If the hydroxyl content b satisfies the preferable minimum value, the interlayer film can provide even higher adhesion. Further, if the hydroxyl content b satisfies the preferable maximum value, the interlayer film can provide even higher sound insulation of the laminated glass.

The polyvinyl acetal resin B is preferably a polyvinyl butyral resin.

The polyvinyl acetal resin A and the polyvinyl acetal resin B each are obtained by acetalizing a polyvinyl alcohol with an aldehyde. The aldehyde is preferably a C1 to C10 aldehyde, and is more preferably a C4 or C5 aldehyde.

The polyvinyl acetal resin A and the polyvinyl acetal resin B each are preferably a polyvinyl acetal resin which can be obtained by acetalizing with an aldehyde a polyvinyl alcohol X having a degree of polymerization of 1600 to 3000. The degree of polymerization of the polyvinyl alcohol X is preferably 1700 or higher, preferably higher than 1700, preferably 1800 or higher, preferably 2000 or higher, preferably 2100 or higher, preferably 2200 or higher, preferably 2900 or lower, and preferably 2800 or lower because those degrees can sufficiently suppress bubble formation and bubble growth. The degree of polymerization means an average degree of polymerization. Meanwhile, the average degree of polymerization can be obtained by the method according to JIS K6726 "Testing Methods for Polyvinyl alcohol".

(Method of Producing Polyvinyl Acetal Resin Containing High Molecular Weight Component X with an Absolute Molecular Weight of 1000000 or More or High Molecular Weight Component Y with a Molecular Weight y of 1000000 or More)

The following will describe a concrete method of producing a polyvinyl acetal resin containing the high molecular weight component X with an absolute molecular weight of 1000000 or more or the high molecular weight component Y with the molecular weight y of 1000000 or more as an example of a thermoplastic resin that contains at least the lowest ratio of the high molecular weight component X with an absolute molecular weight of 1000000 or more or the high molecular weight component Y with the molecular weight y of 1000000 or more.

First, a polyvinyl alcohol is prepared. The polyvinyl alcohol can be obtained by, for example, saponification of polyvinyl acetate. The saponification degree of the polyvinyl alcohol is generally in the range of 70 to 99.9 mol %, preferably 75 to 99.8 mol %, and more preferably 80 to 99.8 mol %.

The lowest degree of polymerization of the polyvinyl alcohol is preferably 200, more preferably 500, still more preferably 1000, and particularly preferably 1500. The highest degree is preferably 3000, more preferably 2900, still more preferably 2800, and particularly preferably 2700. If the degree of polymerization is too low, the penetration resistance of the laminated glass tends to deteriorate. If the degree of polymerization is too high, molding of the interlayer film may be difficult.

Next, the polyvinyl alcohol is reacted with an aldehyde with a catalyst for acetalization of the polyvinyl alcohol. A solution containing the polyvinyl alcohol may be used. Examples of the solvent to be used for the solution containing the polyvinyl alcohol include water.

Preferable examples of the method of producing the polyvinyl acetal resin contained in each of the interlayer films 2 and 21 include a production method in which a polyvinyl alcohol is reacted with an aldehyde with a catalyst for acetalization of the polyvinyl alcohol so that a polyvinyl acetal resin is prepared.

The method of producing the interlayer films 2 and 21 preferably includes a step of reacting a polyvinyl alcohol with an aldehyde with a catalyst for acetalization of the polyvinyl alcohol so that a polyvinyl acetal resin is prepared; and a step of preparing an interlayer film for a laminated glass using a mixture of the above-obtained polyvinyl acetal resin and a plasticizer. A multilayer interlayer film can be prepared by laminating the second interlayer film for a laminated glass on the interlayer film for a laminated glass, optionally followed by lamination of the third interlayer film for a laminated glass, if desired, during the process of preparing the interlayer film for a laminated glass or after preparing the interlayer film for a laminated glass. Moreover, a multilayer interlayer film may be produced by coextrusion of the interlayer film 21 and the second interlayer film for a laminated glass. Furthermore, a multilayer interlayer film may be produced by coextrusion of the interlayer film 21, the second interlayer film for a laminated glass, and the third interlayer film for a laminated glass.

The aldehyde is not particularly limited. Generally, a C1 to 010 aldehyde is suitably used as the above aldehyde. Examples of the C1 to C10 aldehyde include propionaldehyde, n-butyraldehyde, isobutyraldehyde, N-valeraldehyde, 2-ethylbutyraldehyde, n-hexyl aldehyde, n-octyl aldehyde, n-nonyl aldehyde, n-decyl aldehyde, formaldehyde, acetaldehyde, and benzaldehyde. Particularly, n-butyraldehyde, n-hexyl aldehyde, and n-valeraldehyde are preferable, and n-butyraldehyde is more preferable. Each of the above aldehydes may be used alone, or two or more of the aldehydes may be used in combination.

In terms of easy preparation of the polyvinyl acetal resin containing the specific ratio of the high molecular weight component X with an absolute molecular weight of 1000000 or more or the high molecular weight component Y with the molecular weight y of 1000000 or more, for example, before or during the acetalization reaction using the aldehyde, the following methods may be exemplified: a method in which a crosslinking agent such as dialdehyde is added for crosslinking a main chain of the adjacent polyvinyl alcohol; a method in which an excessive amount of aldehyde is added to promote intermolecular acetalization; and a method of adding a polyvinyl alcohol with a high polymerization degree. Those methods may be performed alone, or two or more kinds thereof may be performed in combination.

The catalyst is preferably an acid catalyst. Examples of the acid catalyst include nitric acid, hydrochloric acid, sulfuric acid, phosphoric acid, and para-toluene sulfonic acid.

The polystyrene-equivalent molecular weight refers to a molecular weight equivalent to polystyrene as determined by gel permeation chromatography (GPC). The ratio (%) of the high molecular weight component Y with the molecular weight y of 1000000 or more in the thermoplastic resin is calculated from the ratio of an area corresponding to the region of the molecular weight y of 1000000 or more in the peak area detected by an RI detector during the measurement of the polystyrene-equivalent molecular weight of the thermoplastic resin by GPC. The peak area refers to an area between the peak of the component measured and a base line.

The polystyrene-equivalent molecular weight is measured, for example, as follows.

In order to determine the polystyrene-equivalent molecular weight, GPC measurement is performed on the polystyrene standard samples whose molecular weights are known. The polystyrene standard samples used ("Shodex Standard SM-105" and "Shodex Standard SH-75" produced by Showa Denko K.K.) are 14 samples having weight-average molecular weights of 580, 1260, 2960, 5000, 10100, 21000, 28500, 76600, 196000, 630000, 1130000, 2190000, 3150000, and 3900000. An approximation straight line, obtained by plotting the weight-average molecular weights relative to the elution times shown by the peak tops of the respective standard sample peaks, can be used as a calibration curve. For example, in the case of measuring the ratio (%) of the high molecular weight component Y with the molecular weight y of 1000000 or more in the thermoplastic resin in the multilayer interlayer film that is formed by laminating the surface layer, the intermediate layer, and the surface layer in the stated order, the surface layers and the intermediate layer are separated from the multilayer interlayer film that has been left to stand in a constant temperature and humidity room (humidity: 30% (±3%), temperature: 23° C.) for one month. The separated intermediate layer is dissolved in tetrahydrofuran (THF) so that 0.1% by weight of a solution is prepared. The solution is analyzed with a GPC device to determine the peak area of the thermoplastic resin in the intermediate layer. Thereafter, based on the elution time of the thermoplastic resin in the intermediate layer and the calibration curve, an area corresponding to the region of the polystyrene-equivalent molecular weight of 1000000 or more of the thermoplastic resin in the intermediate layer is calculated. The value obtained by dividing the area corresponding to the region of the polystyrene-equivalent molecular weight of 1000000 or more of the thermoplastic resin in the intermediate layer by the peak area of the thermoplastic resin in the intermediate layer is expressed in percentage (%). Accordingly, the ratio (%) of the high molecular weight component Y with the molecular weight y of 1000000 or more in the thermoplastic resin can be calculated. For example, the polystyrene-equivalent molecular weight can be measured by using Gel Permeation Chromatography (GPC) device (produced by Hitachi High-technologies Corporation, "RI: L2490, autosampler: L-2200, pump: L-2130, column oven: L-2350, column: GL-A120-S and GL-A100MX-S in series").

(Plasticizer)

The plasticizer in each of the interlayer films 2 to 4 and 21 is not particularly limited. The plasticizer may be a publicly known plasticizer. One plasticizer may be used alone or two or more plasticizers may be used in combination as the above plasticizer.

Examples of the plasticizer include organic ester plasticizers such as a monobasic organic acid ester and a polybasic organic acid ester, and phosphoric acid plasticizers such as an organic phosphoric acid plasticizer and an organic phosphorous acid plasticizer. Among these, an organic ester plasticizer is preferable. The plasticizer is preferably a liquid plasticizer.

Examples of the monobasic organic acid ester include, but not particularly limited to, a glycol ester obtained through the reaction of glycol and a monobasic organic acid, and an ester of a monobasic organic acid and triethylene glycol or tripropylene glycol. Examples of the glycol include triethylene glycol, tetraethylene glycol, and tripropylene glycol. Examples of the monobasic organic acid include butanoic acid, isobutyric acid, caproic acid, 2-ethylbutanoic acid, heptylic acid, n-octyl acid, 2-ethylhexyl acid, n-nonylic acid, and decylic acid.

Examples of the polybasic organic acid ester include, but not particularly limited to, ester compounds such as one of a polybasic organic acid and a C4 to C8 straight or branched chain alcohol. Examples of the polybasic organic acid include adipic acid, sebacic acid, and azelaic acid.

Examples of the organic ester plasticizer include, but not particularly limited to, triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, dibutyl sebacate, dioctylazelate, dibutylcarbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicaprylate, dihexyl adipate, dioctyl adipate, hexylcyclohexyl adipate, a mixture of heptyl adipate and nonyl adipate, diisononyl adipate, diisodecyl adipate, heptyl nonyl adipate, dibutyl sebacate, oil-modified alkyd sebacate, and a mixture of phosphate and adipate. An organic ester plasticizer other than these may be used. Adipates other than the above adipate may be used.

Examples of the organic phosphoric acid plasticizer include, but not particularly limited to, tributoxyethyl phosphate, isodecyl phenyl phosphate, and triisopropyl phosphate.

The plasticizer is preferably a diester plasticizer represented by the following formula (I). The use of a diester plasticizer can further increase the sound insulation of the laminated glass.

[Chem. 1]

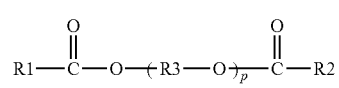

formula (1)

In formula (I), R1 and R2 each represent a C5 to C10 organic group, R3 represents an ethylene group, an isopropylene group, or an n-propylene group, and p represents an integer of 3 to 10. R1 and R2 in formula (I) each preferably represent a C6 to C10 organic group.

The plasticizer preferably contains at least one kind among triethylene glycol di-2-ethylhexanoate (3GO) and triethylene glycol di-2-ethylbutyrate (3 GH).

The amount of the plasticizer in the interlayer film for a laminated glass is not particularly limited.

In the case of the interlayer film 2 or 21 in which the thermoplastic resin contains the high molecular weight component X with an absolute molecular weight of 1000000 or more at the specific ratio, the minimum amount of the plasticizer for each 100 parts by weight of the thermoplastic resin is preferably 40 parts by weight, more preferably 50 parts by weight, still more preferably 55 parts by weight, and particularly preferably 60 parts by weight. The maximum amount is preferably 80 parts by weight, more preferably 78 parts by weight, still more preferably 75 parts by weight, and particularly preferably 72 parts by weight. Also, in the case of the interlayer film 2 or 21 in which the thermoplastic resin contains the high molecular weight component Y with the molecular weight y of 1000000 or more at the specific ratio, the minimum amount of the plasticizer for each 100 parts by weight of the thermoplastic resin is preferably 40 parts by weight, more preferably 50 parts by weight, still more preferably 55 parts by weight, and particularly preferably 60 parts by weight. The maximum amount is preferably 80 parts by weight, more preferably 78 parts by weight, further preferably 75 parts by weight, and particularly preferably 72 parts by weight. If the amount of the plasticizer satisfies the preferable minimum amount, the penetration resistance of the laminated glass can be further increased. If the amount of the plasticizer satisfies the preferable maximum amount, the transparency of the interlayer film or the multilayer interlayer film can be further increased.

In the case of the interlayer films 3 and 4, the minimum amount of the plasticizer for each 100 parts by weight of the thermoplastic resin is preferably 25 parts by weight, more preferably 30 parts by weight, and still more preferably 35 parts by weight. The maximum amount is preferably 50 parts by weight, more preferably 45 parts by weight, still more preferably 43 parts by weight, and particularly preferably 38 parts by weight. If the amount of the plasticizer satisfies the preferable minimum amount, the adhesion force of the interlayer film is increased, which leads to a further increase in the penetration resistance of the laminated glass. If the amount of the plasticizer satisfies the preferable maximum amount, the transparency of the interlayer film or the multilayer interlayer film can be further increased.

In terms of further increasing the sound insulation of the laminated glass, the amount of the plasticizer for each 100 parts by weight of the thermoplastic resin in the interlayer film 2 is preferably larger than the amount of the plasticizer for each 100 parts by weight of the thermoplastic resin in each of the interlayer films 3 and 4. In terms of further increasing the sound insulation of the laminated glass, the amount of the plasticizer for each 100 parts by weight of the thermoplastic resin in the interlayer film 2 is larger than the amount of the plasticizer for each 100 parts by weight of the thermoplastic resin in each of the interlayer films 3 and 4 by preferably 5 parts by weight or more, more preferably 10 parts by weight or more, still more preferably 15 parts by weight or more, and particularly preferably 20 parts by weight or more.

(Other Components)

The interlayer films 2 to 4, and 21 each may contain, if desired, additives such as an ultraviolet ray absorbent, an antioxidant, a light stabilizer, a flame retardant, an antistatic agent, a pigment, a dye, an adhesion regulator, a moisture resistant agent, a fluorescent bleach, and an infrared absorbent.

(Laminated Glass)

Each interlayer film for a laminated glass or multilayer interlayer film for a laminated glass according to the present invention is used to obtain a laminated glass.

Figure 3:
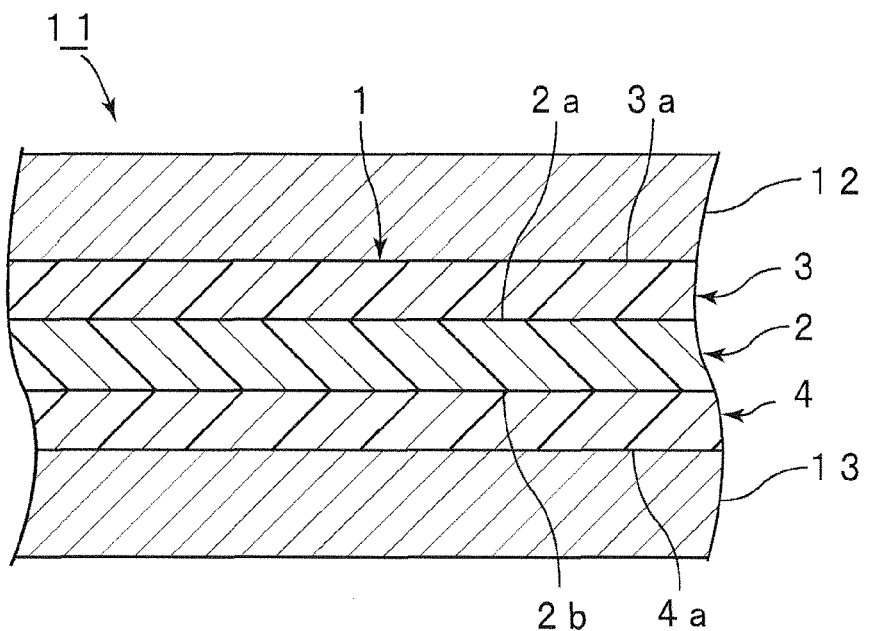
FIG. 3 is a cross-sectional view schematically illustrating one example of a laminated glass including the multilayer interlayer film for a laminated glass illustrated in FIG. 1.

FIG. 3 is a cross-sectional view schematically illustrating one example of a laminated glass using the multilayer interlayer film 1 in FIG. 1.

A laminated glass 11 in FIG. 3 is provided with a first laminated glass component 12, a second laminated glass component 13, and the multilayer interlayer film 1. The multilayer interlayer film 1 is sandwiched between the first laminated glass component 12 and the second laminated glass component 13.

The first laminated glass component 12 is laminated on an outer surface 3a of the second interlayer film 3. The second laminated glass component 13 is laminated on an outer surface 4a of the third interlayer film 4. Therefore, the laminated glass 11 has a structure in which the first laminated glass component 12, the second interlayer film 3, the first interlayer film 2, the third interlayer film 4, and the second laminated glass component 13 are laminated in the stated order.

Examples of the first laminated glass component 12 and the second laminated glass component 13 include glass plates and PET (polyethylene terephthalate) films. The laminated glass encompasses not only a laminated glass having an interlayer film or a multilayer interlayer film sandwiched between two glass plates but also a laminated glass having an interlayer film or a multilayer interlayer film sandwiched between a glass plate and a PET film. A laminated glass is a laminated product provided with glass plate(s) preferably including at least one glass plate.

Examples of the glass plate include inorganic glass and organic glass. Examples of the inorganic glass include float plate glass, heat absorbing plate glass, heat reflecting glass, polished plate glass, molded plate glass, wire plate glass, and lined plate glass. The organic glass is a synthetic resin glass substituted for inorganic glass. Examples of the organic glass include polycarbonate plates and poly(meth)acrylic resin plates. Examples of the poly(meth)acrylic resin plate include polymethyl (meth)acrylate plates.

The thickness of each of the first laminated glass component 12 and the second laminated glass component 13 is preferably 0.5 mm or larger, and more preferably 1 mm or larger. The thickness is also preferably 5 mm or smaller, and more preferably 3 mm or smaller. If the laminated glass components 12 and 13 each are glass plates, the thickness of each glass plate is preferably within the range of 1 to 3 mm. If the laminated glass components 12 and 13 each are PET films, the thickness of each PET film is preferably within the range of 0.03 to 0.5 mm.

The method of producing the laminated glass is not particularly limited. For example, sandwiching the interlayer film or the multilayer interlayer film between the first laminated glass component and the second laminated glass component, and then removing the air remaining between the interlayer film or the multilayer interlayer film and the first laminated glass component and the second laminated glass component by pressing the resulting product with pressure rollers, or by putting the product in a rubber bag for vacuum-sucking. Then, the product is pre-bonded at about 70° C. to 110° C. to obtain a laminate. Next, the laminate is put into an autoclave or is pressed, so as to be pressure-bonded with a pressure of 1 to 1.5 MPa at about 120° C. to 150° C. Thus, the laminated glass can be obtained.

The laminated glass can be widely used for cars, rail cars, aircrafts, boats and ships, buildings, and the like. The laminated glass can be used in applications other than these uses. For example, the laminated glass can be used for windshields, side glass, rear glass, and roof glass of cars.

Hereinafter, the present invention will be described in more detail based on Examples. The present invention is not limited to these Examples.

First, the following polyvinyl acetal resins A to Q, U to Z were synthesized.

Synthesis Example 1

Synthesis of Polyvinyl Acetal Resin A

Ion-exchange water (2700 ml) and a polyvinyl alcohol (300 g) having an average polymerization degree of 2300 and a saponification degree of 87.5 mol % were placed in a reactor vessel equipped with a stirrer, and dissolved by heating while stirring to give a solution. To the solution was added 35% by weight of hydrochloric acid as a catalyst to adjust the hydrochloric acid concentration to 0.6% by weight. After the temperature was adjusted to 15° C., 14.2 g of n-butylaldehyde was added while stirring to the solution. Upon further adding 170 g of n-butylaldehyde, a polyvinyl butyral resin in a white powder form was deposited. Fifteen minutes after the deposition, 35% by weight of hydrochloric acid was added to adjust the hydrochloric acid concentration to 3.9% by weight. The resulting mixture was heated to 45° C. and matured at 45° C. for three hours. The solution was cooled and neutralized. Then, the polyvinyl butyral resin was washed with water and dried to give a polyvinyl butyral resin A.

In the resulting polyvinyl butyral resin A, the ratio of the high molecular weight component X (polyvinyl butyral resin) with an absolute molecular weight of 1000000 or more was 11.5%. In the resulting polyvinyl butyral resin A, the ratio of the high molecular weight component Y (polyvinyl butyral resin) with the molecular weight y of 1000000 or more was 13.8%. The polyvinyl butyral resin A had a number average molecular weight of 102000, a weight average molecular weight of 750000, a hydroxyl content of 22.3 mol %, a degree of acetylation of 12.5 mol %, and a degree of butyralization of 65.2 mol %.

Synthesis Example 2

Synthesis of Polyvinyl Acetal Resin B

Ion-exchange water (2700 ml) and a polyvinyl alcohol (300 g) having an average polymerization degree of 2300 and a saponification degree of 87.5 mol % were placed in a reactor vessel equipped with a stirrer, and dissolved by heating while stirring to give a solution. To the solution was added 35% by weight of hydrochloric acid as a catalyst to adjust the hydrochloric acid concentration to 0.6% by weight. After the temperature was adjusted to 15° C., 14.2 g of n-butylaldehyde was added while stirring to the solution. Upon further adding 175 g of n-butylaldehyde, a polyvinyl butyral resin in a white powder form was deposited. Fifteen minutes after the deposition, 35% by weight of hydrochloric acid was added to adjust the hydrochloric acid concentration to 3.9% by weight. The resulting mixture was heated to 45° C. and matured at 45° C. for three hours. The solution was cooled and neutralized. Then, the polyvinyl butyral resin was washed with water and dried to give a polyvinyl butyral resin B.

In the resulting polyvinyl butyral resin B, the ratio of the high molecular weight component X (polyvinyl butyral resin) with an absolute molecular weight of 1000000 or more was 15.4%. In the resulting polyvinyl butyral resin B, the ratio of the high molecular weight component Y (polyvinyl butyral resin) with the molecular weight y of 1000000 or more was 17.3%. The polyvinyl butyral resin B had a number average molecular weight of 105000, a weight average molecular weight of 1175000, a hydroxyl content of 22.0 mol %, a degree of acetylation of 12.5 mol %, and a degree of butyralization of 65.5 mol %.

Synthesis Example 3

Synthesis of Polyvinyl Acetal Resin C

Ion-exchange water (2700 ml) and a polyvinyl alcohol (300 g) having an average polymerization degree of 2300 and a saponification degree of 87.5 mol % were placed in a reactor vessel equipped with a stirrer, and dissolved by heating while stirring to give a solution. To the solution was added 35% by weight of hydrochloric acid as a catalyst to adjust the hydrochloric acid concentration to 0.6% by weight. After the temperature was adjusted to 15° C., 14.2 g of n-butylaldehyde was added while stirring to the solution. Upon further adding 186 g of n-butylaldehyde, a polyvinyl butyral resin in a white powder form was deposited. Fifteen minutes after the deposition, 35% by weight of hydrochloric acid was added to adjust the hydrochloric acid concentration to 3.9% by weight. The resulting mixture was heated to 45° C. and matured at 45° C. for three hours. The solution was cooled and neutralized. Then, the polyvinyl butyral resin was washed with water and dried to give a polyvinyl butyral resin C.

In the resulting polyvinyl butyral resin C, the ratio of the high molecular weight component X (polyvinyl butyral resin) with an absolute molecular weight of 1000000 or more was 20.9%. In the resulting polyvinyl butyral resin C, the ratio of the high molecular weight component Y (polyvinyl butyral resin) with the molecular weight y of 1000000 or more was 24.5%. The polyvinyl butyral resin C had a number average molecular weight of 120000, a weight average molecular weight of 2565000, a hydroxyl content of 23.0 mol %, a degree of acetylation of 12.5 mol %, and a degree of butyralization of 64.5 mol %.

Synthesis Example 4

Synthesis of Polyvinyl Acetal Resin D

Ion-exchange water (2400 ml) and a polyvinyl alcohol (300 g) having an average polymerization degree of 1700 and a saponification degree of 99.2 mol % were placed in a reactor vessel equipped with a stirrer, and dissolved by heating while stirring to give a solution. To the solution was added 60% by weight of nitric acid as a catalyst to adjust the nitric acid concentration to 0.45% by weight. After the temperature was adjusted to 15° C., 27 g of n-butylaldehyde was added while stirring to the solution. Upon further adding 181 g of n-butylaldehyde, a polyvinyl butyral resin in a white powder form was deposited. Fifteen minutes after the deposition, 60% by weight of nitric acid was added to adjust the nitric acid concentration to 2.1% by weight. The resulting mixture was heated to 48° C. and matured at 48° C. for two hours. The solution was cooled and neutralized. Then, the polyvinyl butyral resin was washed with water and dried to give a polyvinyl butyral resin D.

In the resulting polyvinyl butyral resin D, the ratio of the high molecular weight component X (polyvinyl butyral resin) with an absolute molecular weight of 1000000 or more was 8%. In the resulting polyvinyl butyral resin D, the ratio of the high molecular weight component Y (polyvinyl butyral resin) with the molecular weight y of 1000000 or more was 9.1%. The polyvinyl butyral resin D had a number average molecular weight of 100000, a weight average molecular weight of 520000, a hydroxyl content of 21.7 mol %, a degree of acetylation of 0.8 mol %, and a degree of butyralization of 77.5 mol %.

Synthesis Example 5

Synthesis of Polyvinyl Acetal Resin E

Ion-exchange water (3000 ml) and a polyvinyl alcohol (300 g) having an average polymerization degree of 2300 and a saponification degree of 87.5 mol % were placed in a reactor vessel equipped with a stirrer, and dissolved by heating while stirring to give a solution. To the solution was added 60% by weight of nitric acid as a catalyst to adjust the nitric acid concentration to 0.6% by weight. After the temperature was adjusted to 15° C., 14 g of n-butylaldehyde was added while stirring to the solution. Upon further adding 165 g of n-butylaldehyde, a polyvinyl butyral resin in a white powder form was deposited. Fifteen minutes after the deposition, 60% by weight of nitric acid was added to adjust the nitric acid concentration to 1.3% by weight. The resulting mixture was heated to 42° C. and matured at 42° C. for three hours. The solution was cooled and neutralized. Then, the polyvinyl butyral resin was washed with water and dried to give a polyvinyl butyral resin E.

In the resulting polyvinyl butyral resin E, the ratio of the high molecular weight component X (polyvinyl butyral resin) with an absolute molecular weight of 1000000 or more was 16.4%. In the resulting polyvinyl butyral resin E, the ratio of the high molecular weight component Y (polyvinyl butyral resin) with the molecular weight y of 1000000 or more was 18.7%. The polyvinyl butyral resin E had a number average molecular weight of 125000, a weight average molecular weight of 1062000, a hydroxyl content of 27.0 mol %, a degree of acetylation of 12.5 mol %, and a degree of butyralization of 60.5 mol %.

Synthesis Example 6

Synthesis of Polyvinyl Acetal Resin F

Ion-exchange water (2700 ml) and a polyvinyl alcohol (300 g) having an average polymerization degree of 1700 and a saponification degree of 99.2 mol % were placed in a reactor vessel equipped with a stirrer, and dissolved by heating while stirring to give a solution. To the solution was added 35% by weight of hydrochloric acid as a catalyst to adjust the hydrochloric acid concentration to 0.2% by weight. After the temperature was adjusted to 15° C., 23 g of n-butylaldehyde was added while stirring to the solution. Upon further adding 143 g of n-butylaldehyde, a polyvinyl butyral resin in a white powder form was deposited. Fifteen minutes after the deposition, 35% by weight of hydrochloric acid was added to adjust the hydrochloric acid concentration to 1.8% by weight. The resulting mixture was heated to 60° C. and matured at 60° C. for two hours. The solution was cooled and neutralized. Then, the polyvinyl butyral resin was washed with water and dried to give a polyvinyl butyral resin F.

The polyvinyl butyral resin F had a number average molecular weight of 125000, a weight average molecular weight of 1062000, a hydroxyl content of 30.4 mol %, a degree of acetylation of 0.8 mol %, and a degree of butyralization of 68.8 mol %.

Synthesis Example 7

Synthesis of Polyvinyl Acetal Resin G

Ion-exchange water (3000 ml) and a polyvinyl alcohol (300 g) having an average polymerization degree of 2300 and a saponification degree of 87.5 mol % were placed in a reactor vessel equipped with a stirrer, and dissolved by heating while stirring to give a solution. To the solution was added 60% by weight of nitric acid as a catalyst to adjust the nitric acid concentration to 0.6% by weight. After the temperature was adjusted to 15° C., 14.2 g of n-butylaldehyde was added while stirring to the solution. Upon further adding 165 g of n-butylaldehyde, a polyvinyl butyral resin in a white powder form was deposited. Fifteen minutes after the deposition, 60% by weight of nitric acid was added to adjust the nitric acid concentration to 1.3% by weight. The resulting mixture was heated to 55° C. and matured at 55° C. for three hours. The solution was cooled and neutralized. Then, the polyvinyl butyral resin was washed with water and dried to give a polyvinyl butyral resin G.

In the resulting polyvinyl butyral resin G, the ratio of the high molecular weight component X (polyvinyl butyral resin) with an absolute molecular weight of 1000000 or more was 7.3%. In the resulting polyvinyl butyral resin G, the ratio of the high molecular weight component Y (polyvinyl butyral resin) with the molecular weight y of 1000000 or more was 8.8%. The polyvinyl butyral resin G had a number average molecular weight of 85000, a weight average molecular weight of 509000, a hydroxyl content of 23.0 mol %, a degree of acetylation of 12.5 mol %, and a degree of butyralization of 64.5 mol %.

Synthesis Example 8

Synthesis of Polyvinyl Acetal Resin H

Ion-exchange water (2400 ml) and a polyvinyl alcohol (300 g) having an average polymerization degree of 1700 and a saponification degree of 99.2 mol % were placed in a reactor vessel equipped with a stirrer, and dissolved by heating while stirring to give a solution. To the solution was added 60% by weight of nitric acid as a catalyst to adjust the nitric acid concentration to 0.45% by weight. After the temperature was adjusted to 15° C., 27 g of n-butylaldehyde was added while stirring to the solution. Upon further adding 181 g of n-butylaldehyde, a polyvinyl butyral resin in a white powder form was deposited. Fifteen minutes after the deposition, 60% by weight of nitric acid was added to adjust the nitric acid concentration to 2.1% by weight. The resulting mixture was heated to 55° C. and matured at 55° C. for two hours. The solution was cooled and neutralized. Then, the polyvinyl butyral resin was washed with water and dried to give a polyvinyl butyral resin H.

In the resulting polyvinyl butyral resin H, the ratio of the high molecular weight component X (polyvinyl butyral resin) with an absolute molecular weight of 1000000 or more was 6.5%. In the resulting polyvinyl butyral resin H, the ratio of the high molecular weight component Y (polyvinyl butyral resin) with the molecular weight y of 1000000 or more was 7.6%. The polyvinyl butyral resin H had a number average molecular weight of 112000, a weight average molecular weight of 500000, a hydroxyl content of 21.2 mol %, a degree of acetylation of 0.8 mol %, and a degree of butyralization of 78.0 mol %.

Synthesis Example 9

Synthesis of Polyvinyl Acetal Resin I

Ion-exchange water (3000 ml) and a polyvinyl alcohol (300 g) having an average polymerization degree of 2300 and a saponification degree of 86.9 mol % were placed in a reactor vessel equipped with a stirrer, and dissolved by heating while stirring to give a solution. To the solution was added 60% by weight of nitric acid as a catalyst to adjust the nitric acid concentration to 0.6% by weight. After the temperature was adjusted to 15° C., 13 g of n-butylaldehyde was added while stirring to the solution. Upon further adding 180 g of n-butylaldehyde, a polyvinyl butyral resin in a white powder form was deposited. Fifteen minutes after the deposition, 60% by weight of nitric acid was added to adjust the nitric acid concentration to 1.7% by weight. The resulting mixture was heated to 52° C. and matured at 52° C. for two hours. The solution was cooled and neutralized. Then, the polyvinyl butyral resin was washed with water and dried to give a polyvinyl butyral resin I.

In the resulting polyvinyl butyral resin I, the ratio of the high molecular weight component X (polyvinyl butyral resin) with an absolute molecular weight of 1000000 or more was 9%. In the resulting polyvinyl butyral resin I, the ratio of the high molecular weight component Y (polyvinyl butyral resin) with the molecular weight y of 1000000 or more was 11.6%. The polyvinyl butyral resin I had a number average molecular weight of 165000, a weight average molecular weight of 550000, a hydroxyl content of 22.9 mol %, a degree of acetylation of 13.1 mol %, and a degree of butyralization of 64.0 mol %.

Synthesis Example 10

Synthesis of Polyvinyl Acetal Resin J

Ion-exchange water (2700 ml) and a polyvinyl alcohol (300 g) having an average polymerization degree of 2500 and a saponification degree of 99.2 mol % were placed in a reactor vessel equipped with a stirrer, and dissolved by heating while stirring to give a solution. To the solution was added 60% by weight of nitric acid as a catalyst to adjust the nitric acid concentration to 0.6% by weight. After the temperature was adjusted to 15° C., 13 g of n-butylaldehyde was added while stirring to the solution. Upon further adding 200 g of n-butylaldehyde, a polyvinyl butyral resin in a white powder form was deposited. Fifteen minutes after the deposition, 60% by weight of nitric acid was added to adjust the nitric acid concentration to 2.0% by weight. The resulting mixture was heated to 52° C. and matured at 52° C. for two hours. The solution was cooled and neutralized. Then, the polyvinyl butyral resin was washed with water and dried to give a polyvinyl butyral resin J.

In the resulting polyvinyl butyral resin J, the ratio of the high molecular weight component X (polyvinyl butyral resin) with an absolute molecular weight of 1000000 or more was 9.5%. In the resulting polyvinyl butyral resin J, the ratio of the high molecular weight component Y (polyvinyl butyral resin) with the molecular weight y of 1000000 or more was 11.8%. The polyvinyl butyral resin J had a number average molecular weight of 167000, a weight average molecular weight of 448000, a hydroxyl content of 21.2 mol %, a degree of acetylation of 0.8 mol %, and a degree of butyralization of 78.0 mol %.

Synthesis Example 11

Synthesis of Polyvinyl Acetal Resin K

Ion-exchange water (3000 ml) and a polyvinyl alcohol (300 g) having an average polymerization degree of 2320 and a saponification degree of 94.4 mol % were placed in a reactor vessel equipped with a stirrer, and dissolved by heating while stirring to give a solution. To the solution was added 60% by weight of nitric acid as a catalyst to adjust the nitric acid concentration to 0.6% by weight. After the temperature was adjusted to 15° C., 13 g of n-butylaldehyde was added while stirring to the solution. Upon further adding 205 g of n-butylaldehyde, a polyvinyl butyral resin in a white powder form was deposited. Fifteen minutes after the deposition, 60% by weight of nitric acid was added to adjust the nitric acid concentration to 2.3% by weight. The resulting mixture was heated to 51° C. and matured at 51° C. for two hours. The solution was cooled and neutralized. Then, the polyvinyl butyral resin was washed with water and dried to give a polyvinyl butyral resin K.

In the resulting polyvinyl butyral resin K, the ratio of the high molecular weight component X (polyvinyl butyral resin) with an absolute molecular weight of 1000000 or more was 9.8%. In the resulting polyvinyl butyral resin K, the ratio of the high molecular weight component Y (polyvinyl butyral resin) with the molecular weight y of 1000000 or more was 12.0%. The polyvinyl butyral resin K had a number average molecular weight of 155000, a weight average molecular weight of 530000, a hydroxyl content of 21.9 mol %, a degree of acetylation of 5.6 mol %, and a degree of butyralization of 72.5 mol %.

Synthesis Example 12

Synthesis of Polyvinyl Acetal Resin L

Ion-exchange water (2700 ml) and a polyvinyl alcohol (300 g) having an average polymerization degree of 1700 and a saponification degree of 87.5 mol % were placed in a reactor vessel equipped with a stirrer, and dissolved by heating while stirring to give a solution. To the solution was added 60% by weight of nitric acid as a catalyst to adjust the nitric acid concentration to 0.6% by weight. After the temperature was adjusted to 15° C., 13 g of n-butylaldehyde was added while stirring to the solution. Upon further adding 175 g of n-butylaldehyde, a polyvinyl butyral resin in a white powder form was deposited. Fifteen minutes after the deposition, 60% by weight of nitric acid was added to adjust the nitric acid concentration to 1.9% by weight. The resulting mixture was heated to 53° C. and matured at 53° C. for two hours. The solution was cooled and neutralized. Then, the polyvinyl butyral resin was washed with water and dried to give a polyvinyl butyral resin L.

In the resulting polyvinyl butyral resin L, the ratio of the high molecular weight component X (polyvinyl butyral resin) with an absolute molecular weight of 1000000 or more was 7.5%. In the resulting polyvinyl butyral resin L, the ratio of the high molecular weight component Y (polyvinyl butyral resin) with the molecular weight y of 1000000 or more was 9.0%. The polyvinyl butyral resin L had a number average molecular weight of 158000, a weight average molecular weight of 546000, a hydroxyl content of 23.5 mol %, a degree of acetylation of 12.5 mol %, and a degree of butyralization of 64.0 mol %.

Synthesis Example 13

Synthesis of Polyvinyl Acetal Resin M

Ion-exchange water (3200 ml) and a polyvinyl alcohol (300 g) having an average polymerization degree of 2300 and a saponification degree of 99.2 mol % were placed in a reactor vessel equipped with a stirrer, and dissolved by heating while stirring to give a solution. To the solution was added 60% by weight of nitric acid as a catalyst to adjust the nitric acid concentration to 0.4% by weight. After the temperature was adjusted to 15° C., 17 g of n-butylaldehyde was added while stirring to the solution. Upon further adding 170 g of n-butylaldehyde, a polyvinyl butyral resin in a white powder form was deposited. Fifteen minutes after the deposition, 60% by weight of nitric acid was added to adjust the nitric acid concentration to 2.1% by weight. The resulting mixture was heated to 55° C. and matured at 55° C. for two and a half hours. The solution was cooled and neutralized. Then, the polyvinyl butyral resin was washed with water and dried to give a polyvinyl butyral resin M.

In the resulting polyvinyl butyral resin M, the ratio of the high molecular weight component X (polyvinyl butyral resin) with an absolute molecular weight of 1000000 or more was 6.9%. In the resulting polyvinyl butyral resin M, the ratio of the high molecular weight component Y (polyvinyl butyral resin) with the molecular weight y of 1000000 or more was 8.4%. The polyvinyl butyral resin M had a number average molecular weight of 148000, a weight average molecular weight of 410000, a hydroxyl content of 20.4 mol %, a degree of acetylation of 0.8 mol %, and a degree of butyralization of 78.8 mol %.

Synthesis Example 14

Synthesis of Polyvinyl Acetal Resin N

Ion-exchange water (3200 ml) and a polyvinyl alcohol (300 g) having an average polymerization degree of 2300 and a saponification degree of 87.8 mol % were placed in a reactor vessel equipped with a stirrer, and dissolved by heating while stirring to give a solution. To the solution was added 60% by weight of nitric acid as a catalyst to adjust the nitric acid concentration to 0.5% by weight. After the temperature was adjusted to 15° C., 11 g of n-butylaldehyde was added while stirring to the solution. Upon further adding 160 g of n-butylaldehyde, a polyvinyl butyral resin in a white powder form was deposited. Fifteen minutes after the deposition, 60% by weight of nitric acid was added to adjust the nitric acid concentration to 1.7% by weight. The resulting mixture was heated to 57° C. and matured at 57° C. for three hours. The solution was cooled and neutralized. Then, the polyvinyl butyral resin was washed with water and dried to give a polyvinyl butyral resin N.

In the resulting polyvinyl butyral resin N, the ratio of the high molecular weight component X (polyvinyl butyral resin) with an absolute molecular weight of 1000000 or more was 7.2%. In the resulting polyvinyl butyral resin N, the ratio of the high molecular weight component Y (polyvinyl butyral resin) with the molecular weight y of 1000000 or more was 8.9%. The polyvinyl butyral resin N had a number average molecular weight of 152000, a weight average molecular weight of 430000, a hydroxyl content of 23.4 mol %, a degree of acetylation of 12.2 mol %, and a degree of butyralization of 64.4 mol %.

Synthesis Example 15

Synthesis of Polyvinyl Acetal Resin O

Ion-exchange water (3000 ml) and a polyvinyl alcohol (300 g) having an average polymerization degree of 2000 and a saponification degree of 93.5 mol % were placed in a reactor vessel equipped with a stirrer, and dissolved by heating while stirring to give a solution. To the solution was added 60% by weight of nitric acid as a catalyst to adjust the nitric acid concentration to 0.6% by weight. After the temperature was adjusted to 15° C., 11 g of n-butylaldehyde was added while stirring to the solution. Upon further adding 170 g of n-butylaldehyde, a polyvinyl butyral resin in a white powder form was deposited. Fifteen minutes after the deposition, 60% by weight of nitric acid was added to adjust the nitric acid concentration to 1.8% by weight. The resulting mixture was heated to 58° C. and matured at 58° C. for two hours. The solution was cooled and neutralized. Then, the polyvinyl butyral resin was washed with water and dried to give a polyvinyl butyral resin O.

In the resulting polyvinyl butyral resin O, the ratio of the high molecular weight component X (polyvinyl butyral resin) with an absolute molecular weight of 1000000 or more was 6.6%. In the resulting polyvinyl butyral resin O, the ratio of the high molecular weight component Y (polyvinyl butyral resin) with the molecular weight y of 1000000 or more was 7.6%. The polyvinyl butyral resin O had a number average molecular weight of 138000, a weight average molecular weight of 402000, a hydroxyl content of 20.4 mol %, a degree of acetylation of 6.5 mol %, and a degree of butyralization of 73.1 mol %.

Synthesis Example 16

Synthesis of Polyvinyl Acetal Resin P

Ion-exchange water (2700 ml) and a polyvinyl alcohol (300 g) having an average polymerization degree of 1700 and a saponification degree of 98.9 mol % were placed in a reactor vessel equipped with a stirrer, and dissolved by heating while stirring to give a solution. To the solution was added 60% by weight of nitric acid as a catalyst to adjust the nitric acid concentration to 0.7% by weight. After the temperature was adjusted to 15° C., 15 g of n-butylaldehyde was added while stirring to the solution. Upon further adding 175 g of n-butylaldehyde, a polyvinyl butyral resin in a white powder form was deposited. Fifteen minutes after the deposition, 60% by weight of nitric acid was added to adjust the nitric acid concentration to 1.6% by weight. The resulting mixture was heated to 52° C. and matured at 52° C. for two hours. The solution was cooled and neutralized. Then, the polyvinyl butyral resin was washed with water and dried to give a polyvinyl butyral resin P.

In the resulting polyvinyl butyral resin P, the ratio of the high molecular weight component X (polyvinyl butyral resin) with an absolute molecular weight of 1000000 or more was 5.3%. In the resulting polyvinyl butyral resin P, the ratio of the high molecular weight component Y (polyvinyl butyral resin) with the molecular weight y of 1000000 or more was 6.8%. The polyvinyl butyral resin P had a number average molecular weight of 140000, a weight average molecular weight of 390000, a hydroxyl content of 21.0 mol %, a degree of acetylation of 1.1 mol %, and a degree of butyralization of 77.9 mol %.

Synthesis Example 17

Synthesis of Polyvinyl Acetal Resin Q

Ion-exchange water (3350 ml) and a polyvinyl alcohol (300 g) having an average polymerization degree of 1700 and a saponification degree of 87.8 mol % were placed in a reactor vessel equipped with a stirrer, and dissolved by heating while stirring to give a solution. To the solution was added 60% by weight of nitric acid as a catalyst to adjust the nitric acid concentration to 0.5% by weight. After the temperature was adjusted to 15° C., 15 g of n-butylaldehyde was added while stirring to the solution. Upon further adding 150 g of n-butylaldehyde, a polyvinyl butyral resin in a white powder form was deposited. Fifteen minutes after the deposition, 60% by weight of nitric acid was added to adjust the nitric acid concentration to 1.7% by weight. The resulting mixture was heated to 57° C. and matured at 57° C. for two and a half hours. The solution was cooled and neutralized. Then, the polyvinyl butyral resin was washed with water and dried to give a polyvinyl butyral resin Q.

In the resulting polyvinyl butyral resin Q, the ratio of the high molecular weight component X (polyvinyl butyral resin) with an absolute molecular weight of 1000000 or more was 5.1%. In the resulting polyvinyl butyral resin Q, the ratio of the high molecular weight component Y (polyvinyl butyral resin) with the molecular weight y of 1000000 or more was 6.4%. The polyvinyl butyral resin Q had a number average molecular weight of 143000, a weight average molecular weight of 395000, a hydroxyl content of 22.8 mol %, a degree of acetylation of 12.2 mol %, and a degree of butyralization of 65.0 mol %.

Synthesis Example 18

Synthesis of Polyvinyl Acetal Resin U

Ion-exchange water (3200 ml) and a polyvinyl alcohol (300 g) having an average polymerization degree of 2380 and a saponification degree of 90.5 mol % were placed in a reactor vessel equipped with a stirrer, and dissolved by heating while stirring to give a solution. To the solution was added 60% by weight of nitric acid as a catalyst to adjust the nitric acid concentration to 0.55% by weight. After the temperature was adjusted to 15° C., 13 g of n-butylaldehyde was added while stirring to the solution. Upon further adding 180 g of n-butyl-aldehyde, a polyvinyl butyral resin in a white powder form was deposited. Fifteen minutes after the deposition, 60% by weight of nitric acid was added to adjust the nitric acid concentration to 1.8% by weight. The resulting mixture was heated to 55° C. and matured at 55° C. for three hours. The solution was cooled and neutralized. Then, the polyvinyl butyral resin was washed with water and dried to give a polyvinyl butyral resin U.

In the resulting polyvinyl butyral resin U, the ratio of the high molecular weight component X (polyvinyl butyral resin) with an absolute molecular weight of 1000000 or more was 9.4%. In the resulting polyvinyl butyral resin U, the ratio of the high molecular weight component Y (polyvinyl butyral resin) with the molecular weight y of 1000000 or more was 11.5%. The polyvinyl butyral resin U had a number average molecular weight of 170000, a weight average molecular weight of 530000, a hydroxyl content of 23 mol %, a degree of acetylation of 9.5 mol %, and a degree of butyralization of 67.5 mol %.

Synthesis Example 19

Synthesis of Polyvinyl Acetal Resin V

Ion-exchange water (3400 ml) and a polyvinyl alcohol (300 g) having an average polymerization degree of 2450 and a saponification degree of 82.5 mol % were placed in a reactor vessel equipped with a stirrer, and dissolved by heating while stirring to give a solution. To the solution was added 60% by weight of nitric acid as a catalyst to adjust the nitric acid concentration to 0.65% by weight. After the temperature was adjusted to 15° C., 13 g of n-butylaldehyde was added while stirring to the solution. Upon further adding 175 g of n-butyl-aldehyde, a polyvinyl butyral resin in a white powder form was deposited. Fifteen minutes after the deposition, 60% by weight of nitric acid was added to adjust the nitric acid concentration to 1.9% by weight. The resulting mixture was heated to 55° C. and matured at 55° C. for two and a half hours. The solution was cooled and neutralized. Then, the polyvinyl butyral resin was washed with water and dried to give a polyvinyl butyral resin V.

In the resulting polyvinyl butyral resin V, the ratio of the high molecular weight component X (polyvinyl butyral resin) with an absolute molecular weight of 1000000 or more was 8.5%. In the resulting polyvinyl butyral resin V, the ratio of the high molecular weight component Y (polyvinyl butyral resin) with the molecular weight y of 1000000 or more was 10.9%. The polyvinyl butyral resin V had a number average molecular weight of 150000, a weight average molecular weight of 500000, a hydroxyl content of 23.2 mol %, a degree of acetylation of 17.5 mol %, and a degree of butyralization of 59.3 mol %.

Synthesis Example 20

Synthesis of Polyvinyl Acetal Resin W

Ion-exchange water (3500 ml) and a polyvinyl alcohol (300 g) having an average polymerization degree of 2500 and a saponification degree of 77.7 mol % were placed in a reactor vessel equipped with a stirrer, and dissolved by heating while stirring to give a solution. To the solution was added 60% by weight of nitric acid as a catalyst to adjust the nitric acid concentration to 0.5% by weight. After the temperature was adjusted to 15° C., 15 g of n-butylaldehyde was added while stirring to the solution. Upon further adding 185 g of n-butyl-aldehyde, a polyvinyl butyral resin in a white powder form was deposited. Fifteen minutes after the deposition, 60% by weight of nitric acid was added to adjust the nitric acid concentration to 2.0% by weight. The resulting mixture was heated to 51° C. and matured at 51° C. for two hours. The solution was cooled and neutralized. Then, the polyvinyl butyral resin was washed with water and dried to give a polyvinyl butyral resin W.

In the resulting polyvinyl butyral resin W, the ratio of the high molecular weight component X (polyvinyl butyral resin) with an absolute molecular weight of 1000000 or more was 12.5%. In the resulting polyvinyl butyral resin W, the ratio of the high molecular weight component Y (polyvinyl butyral resin) with the molecular weight y of 1000000 or more was 15%. The polyvinyl butyral resin W had a number average molecular weight of 170000, a weight average molecular weight of 650000, a hydroxyl content of 24 mol %, a degree of acetylation of 22.3 mol %, and a degree of butyralization of 53.7 mol %.

Synthesis Example 21

Synthesis of Polyvinyl Acetal Resin X

Ion-exchange water (2900 ml) and a polyvinyl alcohol (300 g) having an average polymerization degree of 1700 and a saponification degree of 92.6 mol % were placed in a reactor vessel equipped with a stirrer, and dissolved by heating while stirring to give a solution. To the solution was added 60% by weight of nitric acid as a catalyst to adjust the nitric acid concentration to 0.5% by weight. After the temperature was adjusted to 15° C., 14 g of n-butylaldehyde was added while stirring to the solution. Upon further adding 200 g of n-butyl-aldehyde, a polyvinyl butyral resin in a white powder form was deposited. Fifteen minutes after the deposition, 60% by weight of nitric acid was added to adjust the nitric acid concentration to 2.1% by weight. The resulting mixture was heated to 50° C. and matured at 50° C. for three hours. The solution was cooled and neutralized. Then, the polyvinyl butyral resin was washed with water and dried to give a polyvinyl butyral resin X.

In the resulting polyvinyl butyral resin X, the ratio of the high molecular weight component X (polyvinyl butyral resin) with an absolute molecular weight of 1000000 or more was 17.3%. In the resulting polyvinyl butyral resin X, the ratio of the high molecular weight component Y (polyvinyl butyral resin) with the molecular weight y of 1000000 or more was 19.8%. The polyvinyl butyral resin X had a number average molecular weight of 160000, a weight average molecular weight of 670000, a hydroxyl content of 22 mol %, a degree of acetylation of 7.4 mol %, and a degree of butyralization of 70.6 mol %.

Synthesis Example 22

Synthesis of Polyvinyl Acetal Resin Y

Ion-exchange water (3300 ml) and a polyvinyl alcohol (300 g) having an average polymerization degree of 2350 and a saponification degree of 95.8 mol % were placed in a reactor vessel equipped with a stirrer, and dissolved by heating while stirring to give a solution. To the solution was added 60% by weight of nitric acid as a catalyst to adjust the nitric acid concentration to 0.6% by weight. After the temperature was adjusted to 15° C., 14 g of n-butylaldehyde was added while stirring to the solution. Upon further adding 200 g of n-butyl-aldehyde, a polyvinyl butyral resin in a white powder form was deposited. Fifteen minutes after the deposition, 60% by weight of nitric acid was added to adjust the nitric acid concentration to 2.3% by weight. The resulting mixture was heated to 52° C. and matured at 52° C. for two and a half hours. The solution was cooled and neutralized. Then, the polyvinyl butyral resin was washed with water and dried to give a polyvinyl butyral resin Y.

In the resulting polyvinyl butyral resin Y, the ratio of the high molecular weight component X (polyvinyl butyral resin) with an absolute molecular weight of 1000000 or more was 14.2%. In the resulting polyvinyl butyral resin Y, the ratio of the high molecular weight component Y (polyvinyl butyral resin) with the molecular weight y of 1000000 or more was 17.6%. The polyvinyl butyral resin Y had a number average molecular weight of 160000, a weight average molecular weight of 620000, a hydroxyl content of 21.9 mol %, a degree of acetylation of 4.2 mol %, and a degree of butyralization of 73.9 mol %.

Synthesis Example 23

Synthesis of Polyvinyl Acetal Resin Z

Ion-exchange water (3700 ml) and a polyvinyl alcohol (300 g) having an average polymerization degree of 2400 and a saponification degree of 98.7 mol % were placed in a reactor vessel equipped with a stirrer, and dissolved by heating while stirring to give a solution. To the solution was added 60% by weight of nitric acid as a catalyst to adjust the nitric acid concentration to 0.6% by weight. After the temperature was adjusted to 15° C., 17 g of n-butylaldehyde was added while stirring to the solution. Upon further adding 205 g of n-butylaldehyde, a polyvinyl butyral resin in a white powder form was deposited. Fifteen minutes after the deposition, 60% by weight of nitric acid was added to adjust the nitric acid concentration to 2.3% by weight. The resulting mixture was heated to 53° C. and matured at 53° C. for three hours. The solution was cooled and neutralized. Then, the polyvinyl butyral resin was washed with water and dried to give a polyvinyl butyral resin Z.

In the resulting polyvinyl butyral resin Z, the ratio of the high molecular weight component X (polyvinyl butyral resin) with an absolute molecular weight of 1000000 or more was 11.3%. In the resulting polyvinyl butyral resin Z, the ratio of the high molecular weight component Y (polyvinyl butyral resin) with the molecular weight y of 1000000 or more was 15.3%. The polyvinyl butyral resin Z had a number average molecular weight of 165000, a weight average molecular weight of 600000, a hydroxyl content of 20.5 mol %, a degree of acetylation of 1.3 mol %, and a degree of butyralization of 78.2 mol %.

Moreover, polyvinyl butyral resins R to T described below were prepared.

Polyvinyl butyral resin R: hydroxyl content: 30.4 mol %, degree of acetylation: 0.8 mol %, degree of butyralization: 68.8 mol %

Polyvinyl butyral resin S: hydroxyl content: 30.5 mol %, degree of acetylation: 0.8 mol %, degree of butyralization: 68.7 mol %

Polyvinyl butyral resin T: hydroxyl content: 30.7 mol %, degree of acetylation: 0.8 mol %, degree of butyralization: 68.5 mol %

Using each of the thus obtained polyvinyl acetal resins A to Z, a multilayer interlayer film for a laminated glass and a laminated glass were produced.

Example 1

(1) Production of Multilayer Interlayer Film

To 100 parts by weight of the obtained polyvinyl butyral resin A was added 60 parts by weight of a plasticizer of triethylene glycol di-2-ethylhexanoate (3GO). The mixture was sufficiently kneaded by a mixing roll, so that a resin composition for an intermediate layer was obtained. Next, to 100 parts by weight of the obtained polyvinyl butyral resin F was added 37.5 parts by weight of a plasticizer of triethylene glycol di-2-ethylhexanoate (3GO). The mixture was sufficiently kneaded by a mixing roll, so that a resin composition for a surface layer was obtained.

The resin composition for an intermediate layer and the resin compositions for a surface layer were co-extruded, whereby a multilayer interlayer film in which a surface layer (thickness: 350 µm), an intermediate layer (thickness: 100 µm), and a surface layer (thickness: 350 µm) were laminated in the stated order was produced.

(2) Production of Laminated Glass for Penetration Resistance Test

The obtained multilayer interlayer film was cut into a size of 30 cm (length)×30 cm (width). Next, the multilayer interlayer film was sandwiched between two sheets of transparent float glass (30 cm (length)×30 cm (width)×2.5 mm (thickness)), and thereby a laminate was obtained. The laminate was put into a rubber bag and deaerated for 20 minutes at the degree of vacuum of 2.6 kPa. The deaerated product was put into an oven to further stand at 90° C. for 30 minutes for vacuum-pressing, so that the laminate was pressure-bonded in advance. The preliminary pressure-bonded laminate was pressure-bonded in an autoclave at 135° C. and a pressure of 1.2 MPa for 20 minutes. Thereby, a laminated glass to be used for a penetration resistance test was prepared.

(3) Production of Laminated Glass for Sound Insulation Measurement

A laminated glass to be used for sound insulation measurement was produced by the same procedure as that for preparing the laminated glass for a penetration resistance test, except that the multilayer interlayer film was cut into a size of 30 cm (length)×2.5 cm (width) and each sheet of the transparent float glass used had a size of 30 cm (length)×2.5 cm (width)×2.5 mm (thickness).

(4) Production of Laminated Glass for Bubble Formation Tests A and B

The obtained multilayer interlayer film was cut into a size of 30 cm (length)×15 cm (width), and the cut-out film was left to stand at 23° C. for 10 hours. Here, both faces of the obtained multilayer interlayer film were embossed with the ten-point average roughness of 30 µm. In the cut-out multilayer interlayer film, four 6 mm-diameter through holes were formed on respective four intersection points each located at a distance of 8 cm inward in the lengthwise direction from an end of the multilayer interlayer film and also at a distance of 5 cm inward in the transverse direction from an end of the multilayer interlayer film.

The multilayer interlayer film having the through holes was sandwiched between two sheets of the transparent float glass (30 cm (length)×15 cm (width)×2.5 mm (thickness)), so that a laminate was obtained. The periphery of the laminate was sealed 2 cm from the end with a sealing agent by thermal fusion bonding to encapsulate the air remaining in the embossed parts and in the through holes. The laminate was pressure-bonded at 135° C. and a pressure of 1.2 MPa for 20 minutes, so that the remaining air was dissolved into the multilayer interlayer film. Thereby, sheets of laminated glass to be used for bubble formation tests were obtained.

Examples 2 to 21 and Comparative Examples 1 to 9

A multilayer interlayer film and a laminated glass were produced by the same procedure as that for Example 1, except that the formulations for the first interlayer film, the second interlayer film and the third interlayer film were changed to the values shown in the following Tables 1 to 3.

(Evaluation)
(1) Sound Insulation

The laminated glass was vibrated with a vibration generator for a dumping test ("Vibration generator G21-005D" produced by Shinken Co., Ltd.). The vibration characteristics obtained thereby were amplified with a mechanical impedance measuring device ("XG-81" produced by Rion), and the vibration spectrum was analyzed with an FET spectrum analyzer ("FFT analyzer HP3582A" produced by YOKOGAWA Hewlett-Packard, Ltd.).

From the ratio of the loss factor determined thereby and the resonance frequency with the laminated glass, a graph showing the relation between sound frequency (Hz) and sound transmission loss (dB) at 20° C. was generated, and the minimum sound transmission loss (TL value) around the sound frequency of 2,000 Hz was determined. A higher TL value indicates higher sound insulation. A TL value of 35 dB or higher was evaluated as "○", and a TL value of lower than 35 dB was evaluated as "x". Tables 1 to 3 below show the results.

(2) Bubble Formation Test A (Bubble Formation State)

Five sheets of the laminated glass for bubble formation test A were produced for each multilayer interlayer film, and were left to stand in a 50° C. oven for 100 hours. After the standing, the sheets of the laminated glass were observed by eye in a plan view for the presence or absence of bubbles and the sizes of the bubbles. The bubble formation was determined based on the following criteria.

[Criteria of Bubble Formation State in Forming Test A]

The bubbles in each of the five sheets of the laminated glass were approximated with an ellipse, and the ellipse area was set as a bubble formation area. The average value of the ellipse areas observed in the respective five sheets of the laminated glass was determined, and the ratio (percentage) of the average value of the ellipse areas (bubble formation areas) to the area of the sheet of the laminated glass (30 cm×15 cm) was determined.

○○: No bubble was observed in all the five sheets of the laminated glass

○: Ratio of average value of ellipse area (bubble formation area) was lower than 5%

Δ: Ratio of average value of ellipse area (bubble formation area) was 5% or higher and lower than 10% x: Ratio of average value of ellipse area (bubble formation area) was 10% or higher.

(3) Bubble Formation Test B (Bubble Formation State)

Thirty sheets of the laminated glass for bubble formation test B were produced for each multilayer interlayer film, and were left to stand in an oven at 50° C. for 24 hours. After the standing, the sheets of the laminated glass were observed by eye to confirm the number of sheets of the laminated glass in which forms were observed, and evaluated based on the following evaluation criteria.

[Criteria of Bubble Formation State in Forming Test B]

○○: Forms were observed by eye in at most five sheets of the laminated glass.

○: Forms were observed by eye in at least 6 sheets and at most 10 sheets of the laminated glass.

Δ: Forms were observed by eye in at least 11 sheets and at most 15 sheets of the laminated glass.

x: Forms were observed by eye in at least 16 sheets of the laminated glass.

(4) Penetration Resistance

The surface temperature of sheets of the laminated glass (30 cm (length)×30 cm (width)) used for the penetration resistance test was adjusted to 23° C. Subsequently, according to JIS R 3212, a rigid sphere having a mass of 2260 g and a diameter of 82 mm was dropped from a height of 4 m on the center of each of six sheets of the laminated glass. The laminated glass was considered to have passed the test if all the six sheets of the laminated glass prevented the rigid sphere from penetrating therethrough within five seconds after the rigid sphere hit the sheets. The laminated glass was considered to have failed the test if three or less sheets of the laminated glass prevented the rigid sphere from penetrating therethrough within five seconds after the rigid sphere hit the sheets. In the case of four sheets, another six sheets of the laminated glass were tested again on the penetration resistance. In the case of five sheets, another sheet of the laminated glass was tested. The glass was considered to have passed the test if the other sheet prevented the rigid sphere from penetrating therethrough within five seconds after the rigid sphere hit the sheet. In the same way, a rigid sphere having a mass of 2260 g and a diameter of 82 mm was dropped from heights of 5 m and 6 m on the center of each of six sheets of the laminated glass to evaluate the penetration resistance of the laminated glass.

(Measurement of Absolute Molecular Weight)

The absolute molecular weight and the polystyrene-equivalent molecular weight for giving the ratios of the high molecular weight components X and Y in the synthesis examples 1 to 5, and 7 to 23 were obtained in a below-mentioned manner, using the surface layers and the intermediate layer separated from the obtained multilayer interlayer film.

For measuring the absolute molecular weight, first, the multilayer interlayer film was left to stand in a constant temperature and humidity room (humidity: 30% (±3%), temperature: 23° C.) for one month. After the one-month standing, the surface layers and the intermediate layer were separated from the multilayer interlayer film. The separated intermediated layer was dissolved in tetrahydrofuran (THF) to prepare a 0.1% by weight solution. The resulting solution was analyzed with a Gel Permeation Chromatography (GPC) device (produced by Hitachi High-technologies Corporation, "RI: L2490, autosampler: L-2200, pump: L-2130, column oven: L-2350, column: GL-A120-S and GL-A100MX-S in series"). Meanwhile, the GPC device was connected to a light scattering detector for GPC (produced by Viscotek, "Model 270 (RALS+VISCO"), and thereby chromatography can be performed in each of the detectors. The peaks of the polyvinyl butyral resin components in the chromatograms by the RI detector and the RALS detector were analyzed using an analysis software (Omni SEC), so that an absolute molecular weight of the polyvinyl butyral resin at each elution time was obtained. The ratio of the area of the region corresponding to the molecular weight of the polyvinyral resin of 1000000 or more in the peak area of the polyvinyl butyral resin detected by the RI detector was expressed in a percentage (%).

The following equations are satisfied for the peaks of the respective components in the chromatograms.

$$A_{RI} = c \times (dn/dc) \times K_{RI} \quad \text{Equation (1)}$$

$$A_{RALS} = c \times M \times (dn/dc)^2 \times K_{RALS} \quad \text{Equation (2)}$$

In the equations, c represents the polymer concentration; (dn/dc) represents the increment of the refractive index; M represents the absolute molecular weight; and K represents the system's coefficient.

A specific measurement procedure is as follows. First, using a polystyrene standard sample (produced by Viscotek, PolyCAL (registered trademark) TDS-PS-NB Mw=98390, dn/dc=0.185) with known c, M and (dn/dc), a 0.1% by weight THF solution thereof is prepared. Then, the system's coefficient K of each of the detectors is obtained using the equations (1) and (2) from the results of the GPC measurement of the resulting polystyrene solution.

Next, the separated intermediate layer was dissolved in THF to prepare a THF solution thereof. An absolute molecular weight M of the polyvinyl butyral resin was obtained from the results of the GPC measurement of the polyvinyl butyral resin solution using the equations (1) and (2).

Meanwhile, for analysis of the intermediate layer (containing a polyvinyl butyral resin and a plasticizer), it is necessary to obtain the concentration of the polyvinyl butyral resin in the polyvinyl butyral resin solution. The concentration of the polyvinyl butyral resin was calculated according to the results of (measurement of amount of plasticizer) below.

(Measurement of Molecular Weight y)

In the same manner as the measuring method of an absolute molecular weight, a polystyrene-equivalent molecular weight was determined by gel permeation chromatography (GPC), and the ratio (%) of the high molecular weight component Y with the molecular weight y of 1000000 or more in the polyvinyl butyral resin was calculated based on the ratio of the area of the region corresponding to the molecular weight of 1000000 or more in the peak area (GPC measurement result) detected by the RI detector.

In order to determine the polystyrene-equivalent molecular weight, GPC measurement was performed on polystyrene standard samples with known molecular weight. The polystyrene standard samples used ("Shodex Standard SM-105" and "Shodex Standard SH-75" produced by Showa Denko K.K.) were 14 samples having weight-average molecular weights of 580, 1260, 2960, 5000, 10100, 21000, 28500, 76600, 196000, 630000, 1130000, 2190000, 3150000, and 3900000. An approximation straight line, obtained by plotting the weight-average molecular weight against the elution time at the peak top of the respective standard sample peaks, was used as a calibration curve. The surface layers and the intermediate layer were separated from the multilayer interlayer film that has been left to stand in a constant temperature and humidity room (humidity: 30% (±3%), temperature: 23° C.) for one month. The separated intermediate layer was dissolved in tetrahydrofuran (THF) so that a 0.1% by weight solution thereof was prepared. The solution was analyzed with a GPC device to determine the peak area of the thermoplastic resin in the intermediate layer. Thereafter, based on the elution time of the thermoplastic resin in the intermediate layer and the calibration curve, an area corresponding to the region of the polystyrene-equivalent molecular weight of 1000000 or more of the thermoplastic resin in the intermediate layer was calculated. The value obtained by dividing the area corresponding to the region of the polystyrene-equivalent molecular weight of 1000000 or more of the thermoplastic resin in the intermediate layer by the peak area of the thermoplastic resin in the intermediate layer was expressed by percentage (%). Accordingly, the ratio (%) of the high molecular weight component Y with the molecular weight y of 1000000 or more in the thermoplastic resin was calculated.

(Measurement of Amount of Plasticizer)

Plasticizer-THF solutions were prepared by dissolving the plasticizer in THF in a manner that the amounts of the plasticizer were set to 10% by weight, 15% by weight, 20% by weight, 25% by weight, 30% by weight, 35% by weight, 40% by weight, 45% by weight, and 50% by weight. The plasticizer-THF solutions obtained were measured by GPC so that a peak area of the plasticizer was obtained. An approximation straight line was obtained by plotting the peak area of the plasticizer against the concentration of the plasticizer. Next, a solution of the intermediate layer dissolved in THF was measured by GPC. The amount of the plasticizer was obtained from the peak area of the plasticizer using the approximation straight line.

Tables 1 to 3 show the results. In the tables 1 to 3 below, "PVB" refers to polyvinyl butyral, "PVA" refers to polyvinyl alcohol, "3GO" refers to triethylene glycol di-2-ethylhexanoate, and "3 GH" refers to triethylene glycol di-2-ethylbutylate.

TABLE 1

| | | | | Ex. 1 | Ex. 2 | Ex. 3 | Ex. 4 | Ex. 5 | Ex. 6 |
|---|---|---|---|---|---|---|---|---|---|
| Formulation of first interlayer film | PVB resin | Kind | | A | A | B | B | C | C |
| | | Ratio of high molecular weight component X | % | 11.5 | 11.5 | 15.4 | 15.4 | 20.9 | 20.9 |
| | | Ratio of high molecular weight component Y | % | 13.8 | 13.8 | 17.3 | 17.3 | 24.5 | 24.5 |
| | | Average degree of polymerization of PVA | | 2300 | 2300 | 2300 | 2300 | 2300 | 2300 |
| | | Hydroxyl content | mol % | 22.3 | 22.3 | 22.0 | 22.0 | 23.0 | 23.0 |
| | | Degree of acetylation | mol % | 12.5 | 12.5 | 12.5 | 12.5 | 12.5 | 12.5 |
| | | Degree of butyralization | mol % | 65.2 | 65.2 | 65.5 | 65.5 | 64.5 | 64.5 |
| | | Amount of PVB resin | Parts by weight | 100 | 100 | 100 | 100 | 100 | 100 |
| | Plasticizer | Kind | | 3GO | 3GO | 3GO | 3GO | 3GO | 3GO |
| | | Amount | Parts by weight | 60 | 60 | 60 | 60 | 60 | 60 |
| Formulation of second and third interlayer films | PVB resin | Kind | | F | F | F | F | F | F |
| | | Hydroxyl content | mol % | 30.4 | 30.4 | 30.4 | 30.4 | 30.4 | 30.4 |
| | | Degree of acetylation | mol % | 0.8 | 0.8 | 0.8 | 0.8 | 0.8 | 0.8 |
| | | Degree of butyralization | mol % | 68.8 | 68.8 | 68.8 | 68.8 | 68.8 | 68.8 |
| | | Amount of PVB resin | Parts by weight | 100 | 100 | 100 | 100 | 100 | 100 |

TABLE 1-continued

| | | | | | | | | | |
|---|---|---|---|---|---|---|---|---|---|
| | Plasticizer | Kind | | 3GO | 3GO | 3GO | 3GO | 3GO | 3GO |
| | | Amount | Parts by weight | 37.5 | 38.5 | 37.5 | 38.5 | 37.5 | 38.5 |
| Evaluation | Sound insulation: TL value | | | ○ | ○ | ○ | ○ | ○ | ○ |
| | Bubble formation test A | | | ○ | Δ | ○ | ○ | ○○ | ○ |
| | Bubble formation test B | | | ○ | ○ | ○ | ○ | ○○ | ○○ |
| | Penetration resistance | | 4 m | passed | passed | passed | passed | passed | passed |
| | | | 5 m | passed | passed | passed | passed | passed | passed |
| | | | 6 m | passed | passed | passed | passed | passed | passed |

| | | | | Ex. 7 | Ex. 8 | Ex. 9 | Ex. 10 | Ex. 11 |
|---|---|---|---|---|---|---|---|---|
| Formulation of first interlayer film | PVB resin | Kind | | D | D | E | E | A |
| | | Ratio of high molecular weight component X | % | 8.0 | 8.0 | 16.4 | 16.4 | 11.5 |
| | | Ratio of high molecular weight component Y | % | 9.1 | 9.1 | 18.7 | 18.7 | 13.8 |
| | | Average degree of polymerization of PVA | | 1700 | 1700 | 2300 | 2300 | 2300 |
| | | Hydroxyl content | mol % | 21.7 | 21.7 | 27.0 | 27.0 | 22.3 |
| | | Degree of acetylation | mol % | 0.8 | 0.8 | 12.5 | 12.5 | 12.5 |
| | | Degree of butyralization | mol % | 77.5 | 77.5 | 60.5 | 60.5 | 65.2 |
| | | Amount of PVB resin | Parts by weight | 100 | 100 | 100 | 100 | 100 |
| | Plasticizer | Kind | | 3GO | 3GO | 3GO | 3GO | 3GH |
| | | Amount | Parts by weight | 60 | 60 | 60 | 60 | 60 |
| Formulation of second and third interlayer films | PVB resin | Kind | | F | F | F | F | F |
| | | Hydroxyl content | mol % | 30.4 | 30.4 | 30.4 | 30.4 | 30.4 |
| | | Degree of acetylation | mol % | 0.8 | 0.8 | 0.8 | 0.8 | 0.8 |
| | | Degree of butyralization | mol % | 68.8 | 68.8 | 68.8 | 68.8 | 68.8 |
| | | Amount of PVB resin | Parts by weight | 100 | 100 | 100 | 100 | 100 |
| | Plasticizer | Kind | | 3GO | 3GO | 3GO | 3GO | 3GH |
| | | Amount | Parts by weight | 37.5 | 38.5 | 37.5 | 38.5 | 37.5 |
| Evaluation | Sound insulation: TL value | | | ○ | ○ | ○ | ○ | ○ |
| | Bubble formation test A | | | ○ | Δ | ○○ | ○○ | ○ |
| | Bubble formation test B | | | Δ | Δ | ○○ | ○○ | Δ |
| | Penetration resistance | | 4 m | passed | passed | passed | passed | passed |
| | | | 5 m | passed | passed | passed | passed | passed |
| | | | 6 m | passed | passed | passed | passed | passed |

TABLE 2

| | | | | Comp. Ex 1 | Comp. Ex. 2 | Comp. Ex. 3 | Comp. Ex. 4 | Ex. 12 | Ex. 13 | Ex. 14 |
|---|---|---|---|---|---|---|---|---|---|---|
| Formulation of first interlayer film | PVB resin | Kind | | G | G | H | H | I | J | K |
| | | Ratio of high molecular weight component X | % | 7.3 | 7.3 | 6.5 | 6.5 | 9.0 | 9.5 | 9.8 |
| | | Ratio of high molecular weight component Y | % | 8.8 | 8.8 | 7.6 | 7.6 | 11.6 | 11.8 | 12.0 |
| | | Average degree of polymerization of PVA | | 2300 | 2300 | 1700 | 1700 | 2300 | 2500 | 2320 |
| | | Hydroxyl content | mol % | 23.0 | 23.0 | 21.2 | 21.2 | 22.9 | 21.2 | 21.9 |
| | | Degree of acetylation | mol % | 12.5 | 12.5 | 0.8 | 0.8 | 13.1 | 0.8 | 5.6 |
| | | Degree of butyralization | mol % | 64.5 | 64.5 | 78.0 | 78.0 | 64.0 | 78.0 | 72.5 |
| | | Amount of PVB resin | Parts by weight | 100 | 100 | 100 | 100 | 100 | 100 | 100 |
| | Plasticizer | Kind | | 3GO | 3GO | 3GO | 3GO | 3GO | 3GO | 3GO |
| | | Amount | Parts by weight | 70 | 75 | 70 | 75 | 60 | 60 | 60 |
| Formulation of second and third interlayer films | PVB resin | Kind | | F | F | F | F | R | S | R |
| | | Hydroxyl content | mol % | 30.4 | 30.4 | 30.4 | 30.4 | 30.4 | 30.5 | 30.4 |
| | | Degree of acetylation | mol % | 0.8 | 0.8 | 08 | 0.8 | 0.8 | 0.8 | 0.8 |
| | | Degree of butyralization | mol % | 68.8 | 68.8 | 68.8 | 68.8 | 68.8 | 68.7 | 68.8 |
| | | Amount of PVB resin | Parts by weight | 100 | 100 | 100 | 100 | 100 | 100 | 100 |
| | Plasticizer | Kind | | 3GO | 3GO | 3GO | 3GO | 3GO | 3GO | 3GO |
| | | Amount | Parts by weight | 37.5 | 38.5 | 37.5 | 38.5 | 37.5 | 39.5 | 37.5 |
| Evaluation | Sound insulation: TL value | | | ○ | ○ | ○ | ○ | ○ | ○ | ○ |
| | Bubble formation test A | | | x | x | x | x | Δ | Δ | Δ |
| | Bubble formation test B | | | x | x | x | x | ○ | ○ | ○ |
| | Penetration resistance | | 4 m | passed | passed | passed | passed | passed | passed | passed |
| | | | 5 m | passed | passed | passed | passed | passed | passed | passed |

TABLE 2-continued

| | | | | 6 m | passed | passed | passed | passed | passed | passed | passed |
|---|---|---|---|---|---|---|---|---|---|---|---|
| | | | | | Ex. 15 | Comp. Ex. 5 | Comp. Ex. 6 | Comp. Ex. 7 | Comp. Ex. 8 | Comp. Ex. 9 | |
| Formulation of first interlayer film | PVB resin | Kind | | | L | M | N | O | P | Q | |
| | | Ratio of high molecular weight component X | % | | 7.5 | 6.9 | 7.2 | 6.6 | 5.3 | 5.1 | |
| | | Ratio of high molecular weight component Y | % | | 9.0 | 8.4 | 8.9 | 7.6 | 6.8 | 6.4 | |
| | | Average degree of polymerization of PVA | | | 1700 | 2300 | 2300 | 2000 | 1700 | 1700 | |
| | | Hydroxyl content | mol % | | 23.5 | 20.4 | 23.4 | 20.4 | 21.0 | 22.8 | |
| | | Degree of acetylation | mol % | | 12.5 | 0.8 | 12.2 | 6.5 | 1.1 | 12.2 | |
| | | Degree of butyralization | mol % | | 64.0 | 78.8 | 64.4 | 73.1 | 77.9 | 65.0 | |
| | | Amount of PVB resin | Parts by weight | | 100 | 100 | 100 | 100 | 100 | 100 | |
| | Plasticizer | Kind | | | 3GO | 3GO | 3GO | 3GO | 3GO | 3GO | |
| | | Amount | Parts by weight | | 60 | 60 | 60 | 60 | 60 | 60 | |
| Formulation of second and third interlayer films | PVB resin | Kind | | | T | F | F | F | F | F | |
| | | Hydroxyl content | mol % | | 30.7 | 30.4 | 30.4 | 30.4 | 30.4 | 30.4 | |
| | | Degree of acetylation | mol % | | 0.8 | 0.8 | 0.8 | 0.8 | 0.8 | 0.8 | |
| | | Degree of butyralization | mol % | | 68.5 | 68.8 | 68.8 | 68.8 | 68.8 | 68.8 | |
| | | Amount of PVB resin | Parts by weight | | 100 | 100 | 100 | 100 | 100 | 100 | |
| | Plasticizer | Kind | | | 3GO | 3GO | 3GO | 3GO | 3GO | 3GO | |
| | | Amount | Parts by weight | | 37.5 | 37.5 | 37.5 | 37.5 | 37.5 | 37.5 | |
| Evaluation | Sound insulation: TL value | | | | ○ | ○ | ○ | ○ | ○ | ○ | |
| | Bubble formation test A | | | | Δ | x | x | x | x | x | |
| | Bubble formation test B | | | | Δ | x | x | x | x | x | |
| | Penetration resistance | | | 4 m | passed | passed | passed | passed | passed | passed | |
| | | | | 5 m | passed | passed | passed | passed | passed | passed | |
| | | | | 6 m | passed | passed | passed | passed | passed | passed | |

TABLE 3

| | | | | | Ex. 16 | Ex. 17 | Ex. 18 | Ex. 19 | Ex. 20 | Ex. 21 |
|---|---|---|---|---|---|---|---|---|---|---|
| Formulation of first interlayer film | PVB resin | Kind | | | U | V | W | X | Y | Z |
| | | Ratio of high molecular weight component X | % | | 9.4 | 8.5 | 12.5 | 17.3 | 14.2 | 11.3 |
| | | Ratio of high molecular weight component Y | % | | 11.5 | 10.9 | 15 | 19.8 | 17.6 | 15.3 |
| | | Average degree of polymerization of PVA | | | 2380 | 2450 | 2500 | 1700 | 2350 | 2400 |
| | | Hydroxyl content | mol % | | 23 | 23.2 | 24 | 22 | 21.9 | 20.5 |
| | | Degree of acetylation | mol % | | 9.5 | 17.5 | 22.3 | 7.4 | 4.2 | 1.3 |
| | | Degree of butyralization | mol % | | 67.5 | 59.3 | 53.7 | 70.5 | 73.9 | 78.2 |
| | | Amount of PVB resin | Parts by weight | | 100 | 100 | 100 | 100 | 100 | 100 |
| | Plasticizer | Kind | | | 3GO | 3GO | 3GO | 3GO | 3GO | 3GO |
| | | Amount | Parts by weight | | 60 | 60 | 60 | 60 | 60 | 60 |
| Formulation of second and third interlayer films | PVB resin | Kind | | | F | F | F | F | F | F |
| | | Hydroxyl content | mol % | | 30.4 | 30.4 | 30.4 | 30.4 | 30.4 | 30.4 |
| | | Degree of acetylation | mol % | | 0.8 | 0.8 | 0.8 | 0.8 | 0.8 | 0.8 |
| | | Degree of butyralization | mol % | | 68.8 | 68.8 | 68.8 | 68.8 | 68.8 | 68.8 |
| | | Amount of PVB resin | Parts by weight | | 100 | 100 | 100 | 100 | 100 | 100 |
| | Plasticizer | Kind | | | 3GO | 3GO | 3GO | 3GO | 3GO | 3GO |
| | | Amount | Parts by weight | | 37.5 | 37.5 | 37.5 | 37.5 | 37.5 | 37.5 |
| Evaluation | Sound insulation: TL value | | | | ○ | ○ | ○ | ○ | ○ | ○ |
| | Bubble formation test A | | | | ○ | ○ | ○ | ○○ | ○○ | ○ |
| | Bubble formation test B | | | | Δ | Δ | ○ | ○○ | ○ | Δ |
| | Penetration resistance | | | 4 m | passed | passed | passed | passed | passed | passed |
| | | | | 5 m | passed | passed | passed | passed | passed | passed |
| | | | | 6 m | passed | passed | passed | passed | passed | passed |

EXPLANATION OF SYMBOLS

1 Multilayer interlayer film
2 First interlayer film
2a One face
2b The other face
3 Second interlayer film
3a Outer surface
4 Third interlayer film
4a Outer surface
11 Laminated glass
12 First laminated glass component
13 Second laminated glass component
21 Interlayer film

The invention claimed is:

1. A multilayer interlayer film for a laminated glass, comprising:
    a first interlayer film for a laminated glass that contains a polyvinyl acetal resin as a thermoplastic resin and a plasticizer,
    a second interlayer film for a laminated glass that contains a polyvinyl acetal resin as a thermoplastic resin and a plasticizer, and the second interlayer film is laminated on one face of the first interlayer film for a laminated glass, and
    a third interlayer film for a laminated glass that contains a polyvinyl acetal resin as a thermoplastic resin and a plasticizer, and the third interlayer film is laminated on the other face of the first interlayer film for a laminated glass,
    the polyvinyl acetal resin in the first interlayer film having a hydroxyl content of 21.5 mol % or higher and at most 28 mol %,
    wherein the polyvinyl acetal resin in the first interlayer film contains a high molecular weight component with an absolute molecular weight of 1000000 or more, and the ratio of the high molecular weight component in the polyvinyl acetal resin of the first interlayer film is 7.4% or higher, or
    the polyvinyl acetal resin in the first interlayer film for a laminated glass contains a high molecular weight component with a polystyrene-equivalent molecular weight of 1000000 or more, and the ratio of the high molecular weight component in the polyvinyl acetal resin of the first interlayer film is 9% or higher.

2. The multilayer interlayer film for a laminated glass according to claim 1,
    wherein the polyvinyl acetal resin in the first interlayer film for a laminated glass contains a high molecular weight component with an absolute molecular weight of 1000000 or more, and the ratio of the high molecular weight component in the polyvinyl acetal resin of the first interlayer film is 7.4% or higher.

3. A laminated glass comprising:
    a first laminated, glass component, a second laminated glass component, and
    a multilayer interlayer film sandwiched between the first laminated glass component and the second laminated glass component,
    wherein the multilayer interlayer film is the multilayer interlayer film for a laminated glass according to claim 2.

4. The multilayer interlayer film for a laminated glass according to claim 1 or 2,
    wherein an amount of the plasticizer for each 100 parts by weight of the polyvinyl acetal resin in the first interlayer film for a laminated glass is within a range of 40 to 80 parts by weight.

5. The multilayer interlayer film for a laminated glass according to claim 1,
    wherein the polyvinyl acetal resin in the first interlayer film for a laminated glass contains a high molecular weight component with a polystyrene-equivalent molecular weight of 1000000 or more, and the ratio of the high molecular weight component in the polyvinyl acetal resin of the first interlayer film is 9% or higher.

6. The multilayer interlayer film for a laminated glass according to claim 1,
    wherein an amount of the plasticizer for each 100 parts by weight of the polyvinyl acetal resin in the first interlayer film for a laminated glass is larger than an amount of the plasticizer for each 100 parts by weight of the polyvinyl acetal resin in the second interlayer film for a laminated glass.

7. The multilayer interlayer film for a laminated glass according to claim 1,
    wherein an amount of the plasticizer for each 100 parts by weight of the polyvinyl acetal resin in the first interlayer film for a laminated glass is larger than an amount of the plasticizer for each 100 parts by weight of the polyvinyl acetal resin in the third interlayer film for a laminated glass.

8. The multilayer interlayer film for a laminated glass according to claim 1,
    wherein the polyvinyl acetal resin in the first interlayer film for a laminated glass has a degree of acetylation of at most 8 mol % and a degree of acetalization of 70 mol % or higher.

9. The multilayer interlayer film for a laminated glass according to claim 1,
    wherein the polyvinyl acetal resin in the first interlayer film for a laminated glass has a degree of acetylation of higher than 8 mol %.

10. A laminated glass comprising:
    a first laminated glass component, a second laminated glass component, and
    a multilayer interlayer film sandwiched between the first laminated glass component and the second laminated glass component,
    wherein the multilayer interlayer film is the multilayer interlayer film for a laminated glass according to claim 1.

* * * * *